United States Patent
Kotake et al.

(10) Patent No.: US 9,851,444 B2
(45) Date of Patent: Dec. 26, 2017

(54) LASER RADAR DEVICE AND METHOD OF CALCULATING SPEED OF OBJECT TO BE MEASURED

(71) Applicant: Mitsubishi Electric Corporation, Tokyo (JP)

(72) Inventors: Nobuki Kotake, Tokyo (JP); Shumpei Kameyama, Tokyo (JP); Masaharu Imaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 444 days.

(21) Appl. No.: 14/412,359

(22) PCT Filed: May 16, 2013

(86) PCT No.: PCT/JP2013/063692
§ 371 (c)(1),
(2) Date: Dec. 31, 2014

(87) PCT Pub. No.: WO2014/041852
PCT Pub. Date: Mar. 20, 2014

(65) Prior Publication Data
US 2015/0185328 A1     Jul. 2, 2015

(30) Foreign Application Priority Data
Sep. 14, 2012   (JP) ................... 2012-202888

(51) Int. Cl.
*G01C 3/08*   (2006.01)
*G01S 17/95*  (2006.01)
(Continued)

(52) U.S. Cl.
CPC ............... *G01S 17/95* (2013.01); *G01P 5/26* (2013.01); *G01S 17/58* (2013.01)

(58) Field of Classification Search
CPC ............ G01S 17/95; G01S 17/58; G01P 5/26
See application file for complete search history.

(56) References Cited

U.S. PATENT DOCUMENTS 5,132,688 A    7/1992  Shima et al.
2007/0171396 A1  7/2007  Harris et al.

FOREIGN PATENT DOCUMENTS

EP   1749219 A1    2/2007
JP   H03-252581 A  11/1991
(Continued)

OTHER PUBLICATIONS

The extended European search report issued by the European Patent Office dated Mar. 16, 2016, which corresponds to European Patent Application No. 13837680.1-1812 and is related to U.S. Appl. No. 14/412,359.

(Continued)

*Primary Examiner* — Samantha K Abraham
(74) *Attorney, Agent, or Firm* — Studebaker & Brackett PC

(57) ABSTRACT

A speed calculator 16 selects a speed calculation method corresponding to a peak value of an SNR which is detected by a peak SNR detector 15 from among a plurality of speed calculation methods of calculating the speed (wind speed) of an aerosol to calculate the speed (wind speed) of the aerosol according to the speed calculation method. As a result, there is provided an advantage of being able to calculate the speed (wind speed) of the aerosol in a short time with a high degree of accuracy.

6 Claims, 13 Drawing Sheets

(51) Int. Cl.
   *G01S 17/58*    (2006.01)
   *G01P 5/26*     (2006.01)

(56)         References Cited

FOREIGN PATENT DOCUMENTS

| | | |
|---|---|---|
| JP | H08-184666 A | 7/1996 |
| JP | 2006-284260 A | 10/2006 |
| JP | 2008-051541 A | 3/2008 |
| JP | 2010-271058 A | 12/2010 |
| WO | 2005/114253 A1 | 12/2005 |

OTHER PUBLICATIONS

R.M. Huffaker et al.; "Remote Sensing of Atmospheric Wind Velocities Using Solid-State and CO2 Coherent Laser Systems"; Feb. 1994; pp. 181-204; vol. 84; No. 2; Proceedings of the IEEE; New York, US.

International Search Report; PCT/JP2013/063692; dated Aug. 13, 2013.

Fukao, S. et al.; "Radar Remote Sensing of Weather and the Atmosphere"; Kyoto University Press; pp. 112-113; Mar. 30, 2005; ISBN: 4-87698-653-3.

Kameyama, S. et al.; "Performance of Discrete-Fourier-Transform-Based Velocity Estimators for a Wind-Sensing Coherent Doppler Lidar System in the Kolmogorov Turbulence Regime"; IEEE; vol. 47; No. 10; pp. 3560-3569; Nov. 10, 2009.

→ Perform Coherent Integration within Each Range Bin

Perform Incoherent Integration within Each Range Bin

LASER RADAR DEVICE AND METHOD OF CALCULATING SPEED OF OBJECT TO BE MEASURED

FIELD OF THE INVENTION

The present invention relates to a laser radar device that measures, for example, a wind speed, and a method of calculating the speed of an object to be measured.

BACKGROUND OF THE INVENTION

A radar device is known as a device that measures the position of an object existing at a remote point.

A radar device emits a wave, such as an electromagnetic wave or an acoustic wave, toward space, for example, and receives a wave which is reflected by an object which is a measurement object and returns thereto, and analyzes a received signal of the wave to measure the distance and the angle from the radar device to the object.

A weather radar device that sets fine liquid droplets or solid particles (referred to as an "aerosol" from here on) floating in atmospheric air as measurement objects, and that calculates the speed (wind speed) at which the aerosol is moving from the amount of phase rotation of a wave which is reflected by the aerosol and returns thereto is known especially among radar devices.

Further, a laser radar device that uses laser light as an electromagnetic wave, especially among weather radar devices, can observe an object with a high angular resolution and is therefore used as a wind direction and wind speed radar device because the divergence of the beam emitted thereby is very small (refer to nonpatent reference 1).

A conventional laser radar device emits laser light into atmospheric air, and, after that, receives laser light which is reflected by an aerosol existing in the atmospheric air, and returns thereto (laser light which receives a Doppler frequency shift according to the movement speed of the aerosol as the aerosol moves), and performs heterodyne detection on the laser light and local light, thereby detecting a Doppler signal corresponding to the movement speed of the aerosol (wind speed).

FIG. 14 is an explanatory drawing showing the concept of measurement by the conventional laser radar device.

The laser radar device performs a process of splitting the laser light (reflected light) reflected by the aerosol in the atmospheric air at each altitude and returns thereto into segments by time. In general, each reflected light split by time is called a "range bin."

The laser radar device performs a coherent integration at very short intervals on each range bin, and performs a Fourier transform within the range bin.

After that, in order to improve the signal to noise ratio (referred to as SNR (Signal to Noise Ratio) from here on), the laser radar device performs N incoherent integrations on a pulse for each range bin, as shown in FIG. 15.

It is generally known that when the N incoherent integrations are performed, the SNR is improved by a factor of $\sqrt{N}$ (refer to patent reference 1).

FIG. 16 is an explanatory drawing showing the concepts of a wind speed and a wind speed width which are derived from a reception spectrum.

In FIG. 16, a spectrum of wind speed which is acquired when a Gaussian beam is emitted is shown, and the peak of this spectrum is defined as a Doppler speed (wind speed).

As a method of calculating this Doppler speed, in addition to a peak detection method of calculating a Doppler speed from a frequency corresponding to a peak value of the SNR, there is a centroid calculation method of calculating the center of gravity of one or more peak values in the SNR, and calculating a Doppler speed from a frequency corresponding to the center of gravity (refer to nonpatent reference 1).

Further, there is a maximum likelihood estimation method of making variable a parameter of a waveform model of a reception spectrum prepared in advance, searching for a parameter having the highest correlation with a spectrum of a received signal, and calculating the speed of the object to be measured by using the parameter (refer to patent reference 2).

FIG. 17 is an explanatory drawing explaining a merit and a demerit of wind measurements using the peak detection method and those of wind measurements using the centroid calculation method.

When a sampling frequency is denoted by fs and the number of data points is denoted by p, a frequency resolution $\Delta f$ is given by fs/p.

When a wind measurement is performed by using the peak detection method, there is a case in which no peak of the SNR can be correctly detected, as shown in FIG. 17(a), unless the sampling frequency fs is sufficient. Therefore, the wind speed acquired by using the peak detection method may have an error for its true value.

In contrast with this, when a wind measurement is performed by using the centroid calculation method, a wind measurement with accuracy greater than the frequency resolution can be implemented, as shown in FIG. 17(a).

However, when a clutter exists and noise caused by rain or the like is mixed in the received signal, as shown in FIG. 17(b), or when there occurs a statistical fluctuation, a clutter component is added to the calculation of the center of gravity, and therefore a larger error is included in the wind speed acquired by using the centroid calculation method. In such a case, the peak detection method can acquire a value closer to the true wind speed. The difference between FIG. 17(a) and FIG. 17(b) is distinguishable according to the wind speed width acquired.

The above-mentioned maximum likelihood estimation method has a merit of being able to determine a wind speed having a high degree of accuracy because it determines a parameter of a waveform model having the highest correlation with the spectrum of the received signal through repetitive calculations.

Further, there is provided an advantage of being able to reduce an SNR desirable for the wind measurement to a value smaller than that in the peak detection method (refer to nonpatent reference 2).

The maximum likelihood estimation method has another merit of, when a plurality of winds are mixing in the same range bin, being able to measure each wind speed (refer to patent reference 2). FIG. 18 is an explanatory drawing explaining a wind measurement of a plurality of winds using the maximum likelihood estimation method.

However, there is a demerit that because it is necessary to perform repetitive calculations, the speed of the calculation is slower than those in the peak detection method and the centroid calculation method, and the wind measurement rate is slow.

RELATED ART DOCUMENT

Patent Reference

Patent reference 1: Japanese Unexamined Patent Application Publication No. 2006-284260

Patent reference 2: Japanese Unexamined Patent Application Publication No. 2010-271058

Nonpatent Reference

Nonpatent reference 1: "Radar Remote Sensing of Weather and The Atmosphere", Shoichiro Fukao and Kyosuke Hamazu, Kyoto University Press, Mar. 30, 2005, p. 112-113, ISBN 4-87698-653-3

Nonpatent reference 2: Kameyama et al., "Performance of Discrete-Fourier-Transform-Based Velocity Estimators for a Wind-Sensing Coherent Doppler Lidar System in the Kolmogorov Turbulence Regime", IEEE, VOL. 47, NO. 10-2009.

SUMMARY OF THE INVENTION

Problems to be Solved by the Invention

Because conventional laser radar devices are constructed as above, a Doppler speed (wind speed) can be calculated according to a calculation method, such as a peak detection method, a centroid calculation method, or a maximum likelihood estimation method. However, the conventional laser radar devices do not select an appropriate calculation method in consideration of the form of an aerosol in atmospheric air, such as the presence or absence of a clutter, but simply calculates a Doppler speed (wind speed) according to a single calculation method prepared in advance. Therefore, the calculation accuracy of the Doppler speed (wind speed) may degrade dependently upon the form of the aerosol in the atmospheric air. A further problem is that the calculation process of calculating the Doppler speed (wind speed) may take a long time.

The present invention is made in order to solve the above-mentioned problems, and it is therefore an object of the present invention to provide a laser radar device that can calculate the speed of an object to be measured in a short time with a high degree of accuracy, and a method of calculating the speed of an object to be measured in a short time with a high degree of accuracy.

Means for Solving the Problem

In accordance with the present invention, there is provided a laser radar device including: a laser light transmitter and receiver that emits laser light into atmospheric air, receives laser light which is reflected by an object to be measured existing in the atmospheric air and returns thereto, and outputs a received signal of the laser light; a coherent integrator that performs a coherent integration on the received signal outputted from the laser light transmitter and receiver; a spectrum calculator that performs a Fourier transform on the received signal on which the coherent integration is performed by the coherent integrator and performs an incoherent integration on the received signal after the Fourier transform to calculate a spectrum of the received signal; a signal to noise ratio calculator that calculates a signal to noise ratio from both the spectrum of the received signal which is calculated by the spectrum calculator, and a spectrum of a noise signal; and a peak value detector that detects a peak value of the signal to noise ratio calculated by the signal to noise ratio calculator, in which a speed calculator selects a speed calculation method of calculating the speed of the object to be measured from both the peak value of the signal to noise ratio which is detected by the peak value detector and information showing to which one of a calculation rate of the speed and calculation accuracy of the speed a higher priority is given, and calculates the speed of the object to be measured according to the speed calculation method.

Advantages of the Invention

Because the laser radar device in accordance with the present invention is constructed in such a way that the speed calculator selects a speed calculation method of calculating the speed of the object to be measured from both the peak value of the signal to noise ratio which is detected by the peak value detector and the information showing to which one of the calculation rate of the speed and the calculation accuracy of the speed a higher priority is given, and calculates the speed of the object to be measured according to the speed calculation method, there is provided an advantage of being able to calculate the speed of the object to be measured in a short time with a high degree of accuracy.

EMBODIMENTS OF THE INVENTION

Hereafter, in order to explain this invention in greater detail, the preferred embodiments of the present invention will be described with reference to the accompanying drawings.

Embodiment 1

Figure 1:
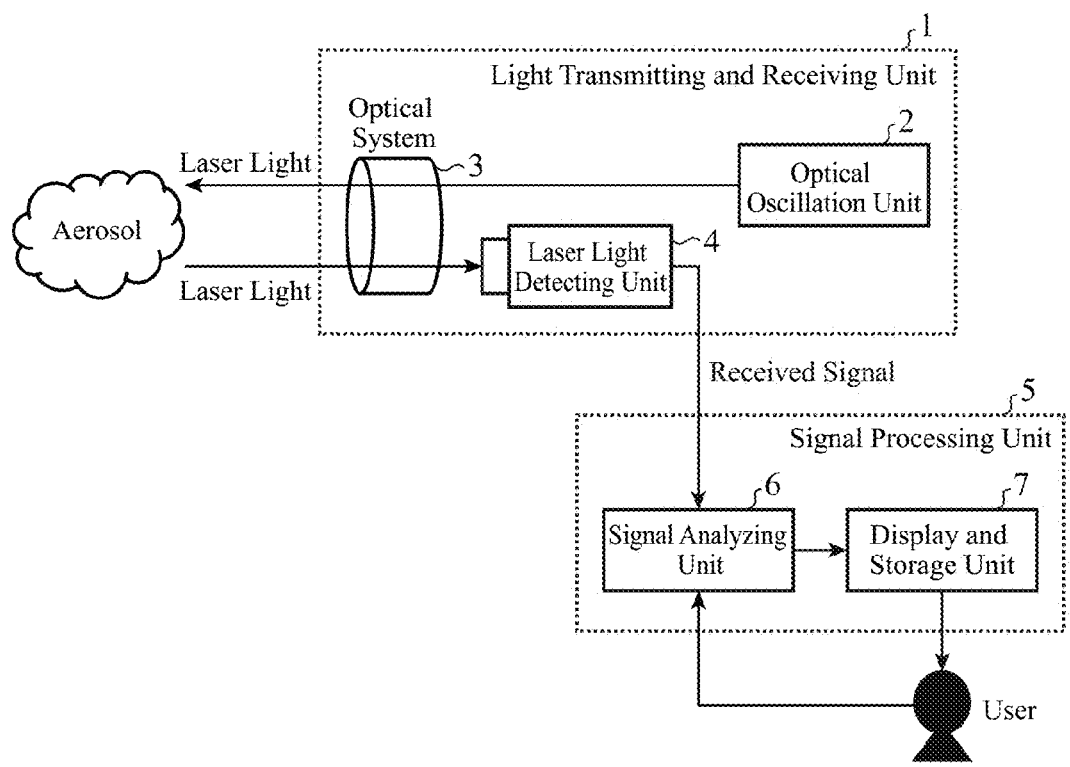
FIG. 1 is a structural diagram showing a laser radar device in accordance with Embodiment 1 of the present invention.

FIG. 1 is a structural diagram showing a laser radar device in accordance with Embodiment 1 of the present invention.

Referring to FIG. 1, a light transmitting and receiving unit 1 is comprised of an optical oscillation unit 2, an optical system 3, and a laser light detecting unit 4, and performs a process of emitting laser light into atmospheric air, receiving laser light which is reflected by an aerosol (object to be measured) existing in the atmospheric air and returns thereto, and outputting a received signal of the laser light to a signal processing unit 5. The light transmitting and receiving unit 1 constructs a laser light transmitter and receiver.

The light transmitting and receiving unit has only to be able to emit laser light which is an electromagnetic wave into atmospheric air, and receive laser light which is reflected by an aerosol and returns thereto, and the light transmitting and receiving unit is not limited to the light transmitting and receiving unit 1 having the structure shown in FIG. 1. Therefore, for example, the light transmission and reception unit 1 can have a structure disclosed by patent reference 1.

The optical oscillation unit 2 of the light transmitting and receiving unit 1 is a light source that oscillates laser light.

The optical system 3 of the light transmitting and receiving unit 1 is comprised of one or more lenses and so on, and is an optical element that focuses the laser light which is reflected by the aerosol and returns thereto onto the laser light detecting unit 4.

The laser light detecting unit 4 of the light transmitting and receiving unit 1 performs a process of receiving the laser light focused by the optical system 3, converting the waveform of the laser light into an electric signal, and outputting the electric signal to the signal processing unit 5 as a received signal.

The signal processing unit 5 is comprised of a signal analyzing unit 6 and a display and storage unit 7, and performs a process of calculating the speed (wind speed) of the aerosol by analyzing the received signal outputted from the light transmitting and receiving unit 1, and displaying the wind speed which is the calculation result.

The signal analyzing unit 6 of the signal processing unit 5 is comprised of, for example, a semiconductor integrated circuit equipped with a CPU, or a one chip microcomputer, and performs a process of calculating the speed (wind speed) of the aerosol by analyzing the received signal outputted from the light transmitting and receiving unit 1.

In this embodiment, although it is assumed that each of the components in the signal analyzing unit 6 consists of hardware for exclusive use (refer to FIG. 2), the signal analyzing unit 6 can alternatively consist of a computer.

In the case in which the signal analyzing unit 6 consists of a computer, a noise signal storage unit 13 which is a component of the signal analyzing unit 6 can be constructed in a memory of the computer and a program in which the details of processing performed by a coherent integration processing unit 11, a spectrum calculating unit 12, an SNR calculating unit 14, a peak SNR detecting unit 15, and a speed calculating unit 16, which are components of the signal analyzing unit 6, are described can be stored in the memory of the computer, and the CPU of the computer can be made to execute the program stored in the memory.

The display and storage unit 7 of the signal processing unit 5 is comprised of, for example, a storage unit, such as a RAM or a hard disk, and a display unit, such as a liquid crystal display, and performs a process of displaying the speed (wind speed) of the aerosol calculated by the signal analyzing unit 6, and also storing the speed (wind speed) of the aerosol.

Figure 2:
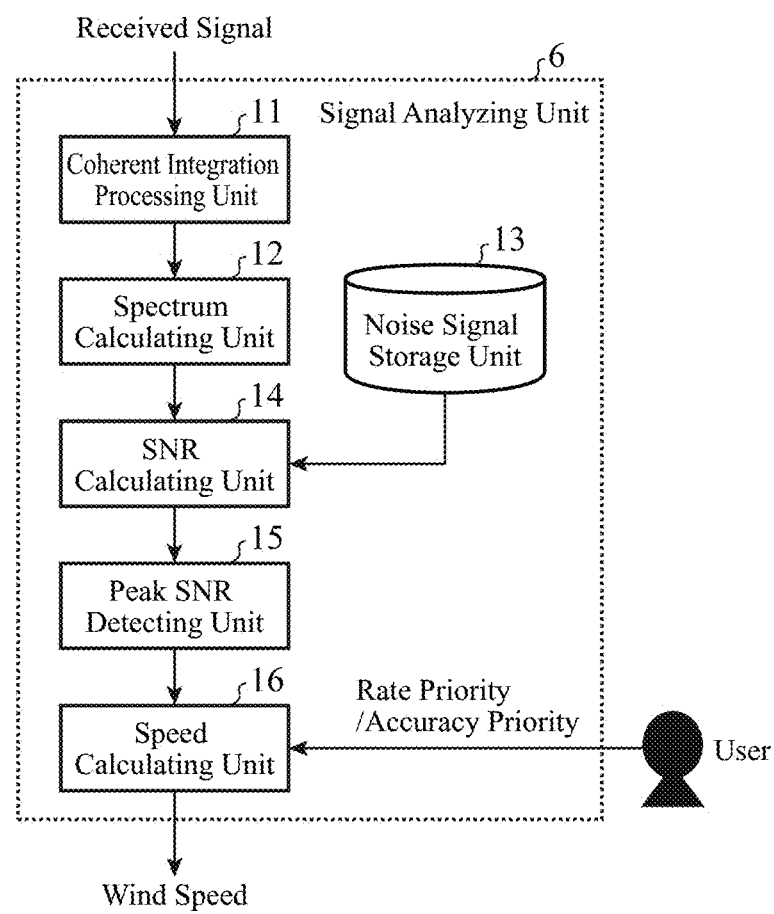
FIG. 2 is a structural diagram showing a signal analyzing unit 6 of the laser radar device in accordance with Embodiment 1 of the present invention.

FIG. 2 is a structural diagram showing the signal analyzing unit 6 of the laser radar device in accordance with Embodiment 1 of the present invention.

Referring to FIG. 2, the coherent integration processing unit 11 performs a process of performing a coherent integration on the received signal outputted from the light transmitting and receiving unit 1, and outputting the received signal after the coherent integration to the spectrum calculating unit 12. The coherent integration processing unit 11 constructs a coherent integrator.

The spectrum calculating unit 12 performs a process of performing a Fourier transform on the received signal on which the coherent integration is performed by the coherent integration processing unit 11, and performing an incoherent integration on the received signal after the Fourier transform to calculate a spectrum of the received signal. The spectrum calculating unit 12 constructs a spectrum calculator.

The noise signal storage unit 13 stores a spectrum of a noise signal (a signal including only noise in which no signal is mixed) in advance. A spectrum of the noise signal should just be acquired in advance. For example, coherent integration can be performed on a noise signal acquired in real time and a Fourier transform can be performed on this noise signal, and incoherent integration can be then performed on the noise signal after the Fourier transform to calculate a spectrum of the noise signal.

The SNR calculating unit 14 performs a process of calculating an SNR (Signal to Noise Ratio) which is a signal to noise ratio by dividing the spectrum of the received signal calculated by the spectrum calculating unit 12 by the spectrum of the noise signal stored in the noise signal storage unit 13.

A signal to noise ratio calculator is comprised of the noise signal storage unit 13 and the SNR calculating unit 14.

The peak SNR detecting unit 15 performs a process of detecting a peak value of the SNR calculated by the SNR calculating unit 14. The peak SNR detecting unit 15 constructs a peak value detector.

The speed calculating unit 16 performs a process of selecting a speed calculation method corresponding to the peak value of the SNR detected by the peak SNR detecting unit 15 from among a plurality of speed calculation methods of calculating the speed (wind speed) of an aerosol (e.g., a peak detection method, a centroid calculation method, and a maximum likelihood estimation method), and calculating the speed (wind speed) of the aerosol according to the speed calculation method. The speed calculating unit 16 constructs a speed calculator.

Figure 3:
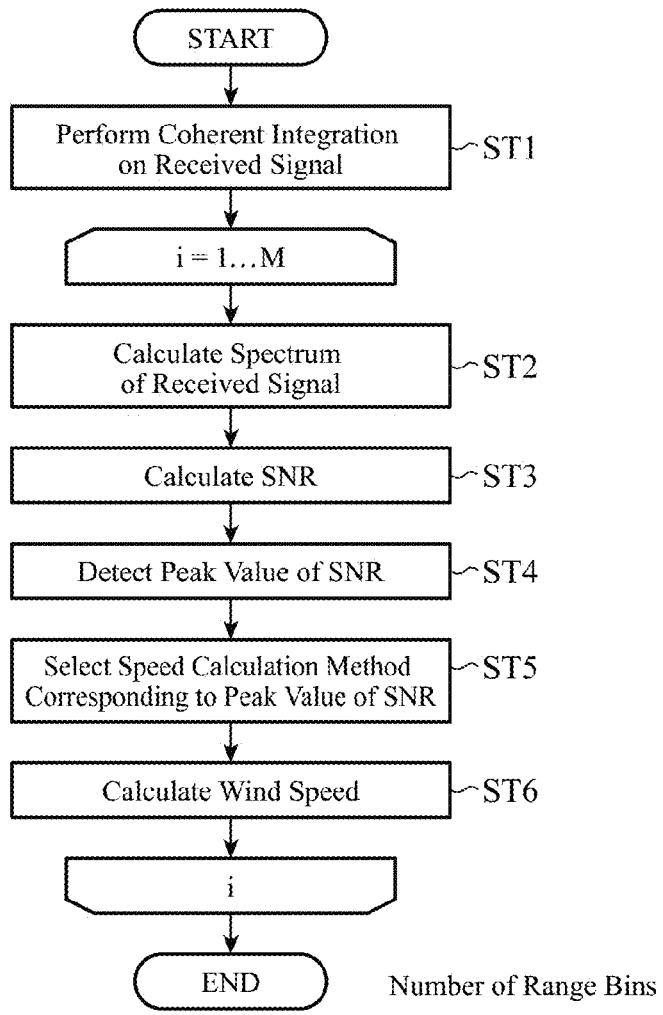
FIG. 3 is a flow chart showing the details of processing (a method of calculating the speed of an object to be measured) performed by the signal analyzing unit 6 of the laser radar device in accordance with Embodiment 1 of the present invention.
Figure 4:
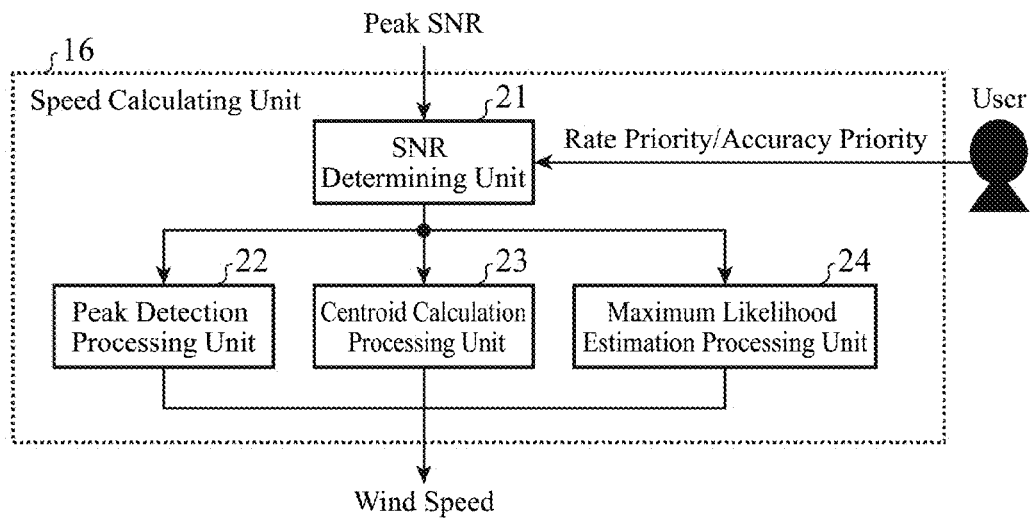
FIG. 4 is a structural diagram showing a speed calculating unit 16 in the signal analyzing unit 6.

FIG. 3 is a flow chart showing the details of processing (a method of calculating the speed of an object to be measured) performed by the signal analyzing unit 6 of the laser radar device in accordance with Embodiment 1 of the present invention FIG. 4 is a structural diagram showing the speed calculating unit 16 in the signal analyzing unit 6.

Referring to FIG. 4, when receiving a command for giving a higher priority to the calculation rate of the speed than to the calculation accuracy of the speed from a user, an SNR determining unit 21 performs a process of selecting the "peak detection method" as the speed calculation method if a peak value (referred to as a "peak SNR" from here on) of the SNR detected by the peak SNR detecting unit 15 is higher than a reference peak value $P_{REF}$ (peak SNR>$P_{REF}$), or selecting the "maximum likelihood estimation method" as the speed calculation method if the peak SNR is equal to or lower than the reference peak value $P_{REF}$ (peak SNR≤$P_{REF}$).

In contrast, when receiving a command for giving a higher priority to the calculation accuracy of the speed than to the calculation rate of the speed from the user, the SNR determining unit 21 performs a process of selecting the "centroid calculation method" as the speed calculation method if the peak SNR is higher than the reference peak value $P_{REF}$ (peak SNR>$P_{REF}$), or selecting the "maximum likelihood estimation method" as the speed calculation method if the peak SNR is equal to or lower than the reference peak value $P_{REF}$ (peak SNR≤$P_{REF}$).

A peak detection processing unit 22 performs a process of calculating the speed (wind speed) of the aerosol from a frequency corresponding to a peak SNR detected by the peak SNR detecting unit 15 when the "peak detection method" is selected by the SNR determining unit 21 as the speed calculation method.

A centroid calculation processing unit 23 performs a process of calculating the center of gravity of one or more peak SNRs detected by the peak SNR detecting unit 15 to calculate the speed (wind speed) of the aerosol from a frequency corresponding to the center of gravity when the "centroid calculation method" is selected by SNR determining unit 21 as the speed calculation method.

A maximum likelihood estimation processing unit 24 performs a process of making variable a parameter of a waveform model of a reception spectrum prepared in advance, searching for a parameter with the highest correlation with the spectrum of the received signal calculated by the spectrum calculating unit 12, and calculating the speed (wind speed) of the aerosol by using the parameter.

Figure 5:
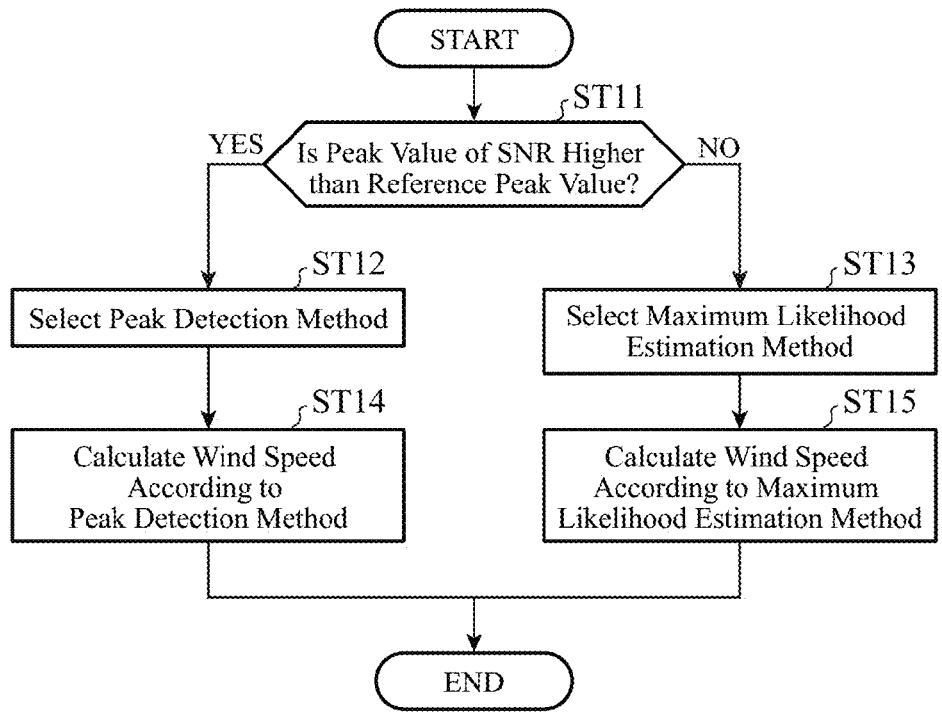
FIG. 5 is a flowchart showing the details of processing performed by the speed calculating unit 16 when a higher priority is given to the calculation rate of the speed than to the calculation accuracy of the speed.

FIG. 5 is a flow chart showing the details of processing performed by the speed calculating unit 16 when a higher priority is given to the calculation rate of the speed than to the calculation accuracy of the speed.

Figure 6:
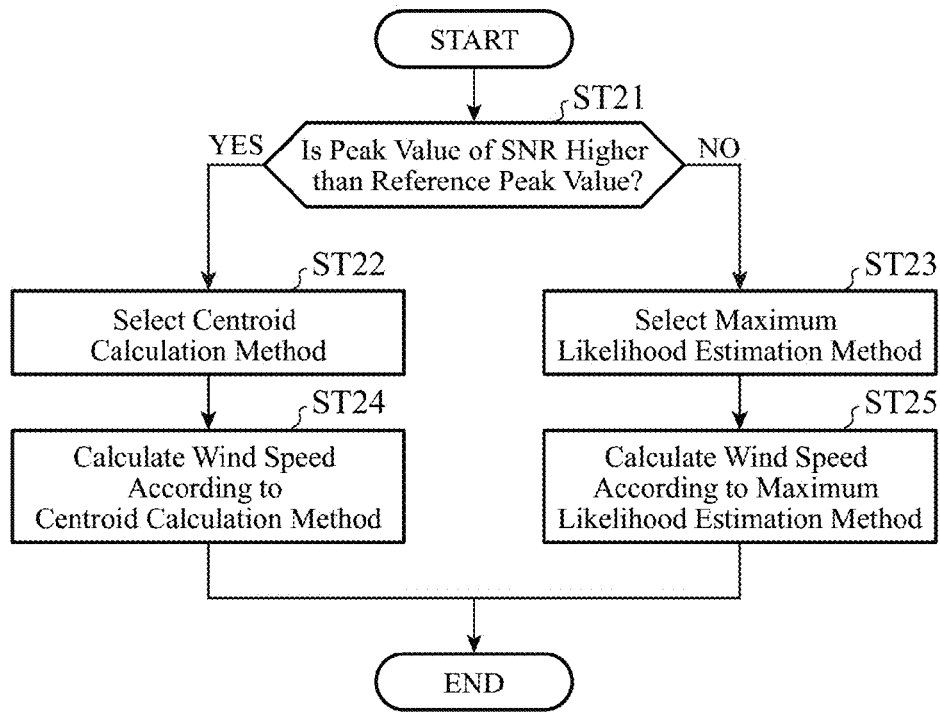
FIG. 6 is a flow chart showing the details of processing performed by the speed calculating unit 16 when a higher priority is given to the calculation accuracy of the speed than to the calculation rate of the speed.

FIG. 6 is a flow chart showing the details of processing performed by the speed calculating unit 16 when a higher priority is given to the calculation accuracy of the speed than to the calculation rate of the speed.

Next, the operation of the laser radar device will be explained.

First, when the optical oscillation unit 2 of the light transmitting and receiving unit 1 oscillates laser light, the laser light is emitted into atmospheric air by way of the optical system 3.

The laser light emitted into the atmospheric air is reflected by an aerosol existing in the atmospheric air, and a reflected part of the laser light is focused by the optical system 3 of the light transmitting and receiving unit 1.

The laser light detecting unit 4 of the light transmitting and receiving unit 1 receives the laser light focused by the optical system 3, converts the waveform of the laser light into an electric signal, and outputs the electric signal to the signal processing unit 5 as a received signal.

When receiving the received signal from the light transmitting and receiving unit 1, the signal analyzing unit 6 of the signal processing unit 5 calculates the speed (wind speed) of the aerosol by analyzing the received signal, and displays the wind speed which is the calculation result on the display and storage unit 7.

Hereafter, the details of processing performed by the signal analyzing unit 6 will be explained concretely.

Figure 14:
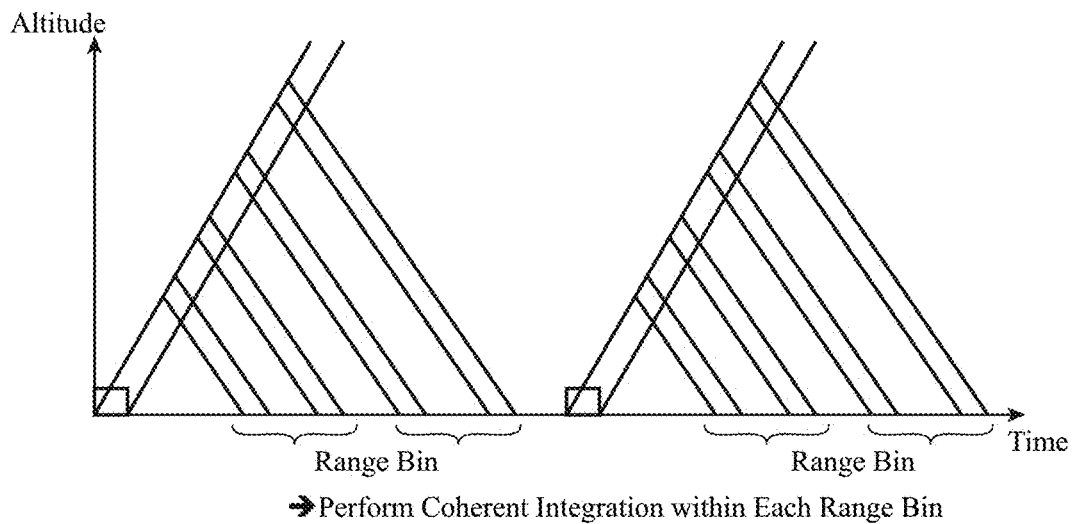
FIG. 14 is an explanatory drawing showing the concept of measurement by a conventional laser radar device.

When receiving the received signal from the light transmitting and receiving unit 1, the coherent integration processing unit 11 of the signal analyzing unit 6 performs a coherent integration on the received signal for each range bin i (i=1, 2, . . . , M), as shown in FIG. 14, and outputs the received signal after the coherent integration to the spectrum calculating unit 12 (step ST1 of FIG. 3).

For example, when the distance from the laser radar device to the aerosol is 1 km and the distance width of each range bin is 100 m, the number M of range bins is 10.

As an alternative, the user can determine the number M of range bins. For example, when the distance from the laser radar device to the aerosol is 1 km, and the user determines the number M of range bins as 20, the distance width of each range bin is 50 m.

When receiving the received signal after the coherent integration from the coherent integration processing unit 11, the spectrum calculating unit 12 performs a Fourier transform on the received signal after the coherent integration for each range bin i.

Figure 15:
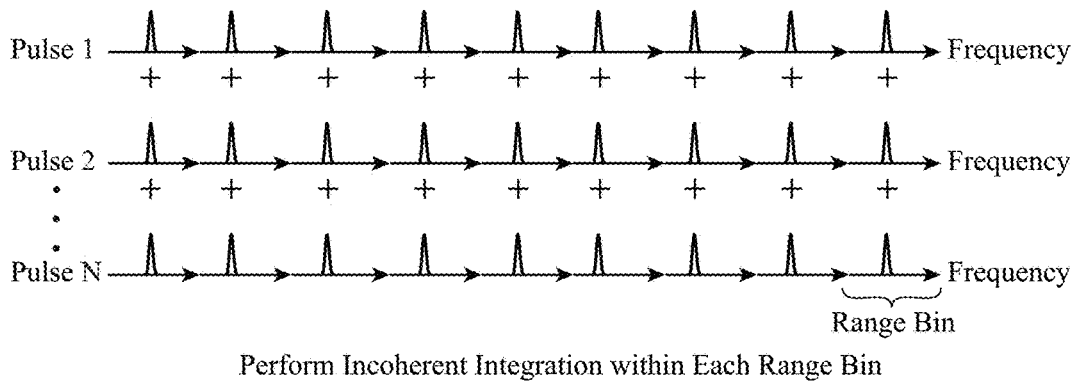
FIG. 15 is an explanatory drawing showing the details of signal processing of measuring a Doppler speed which is performed by the laser radar device.
Figure 16:
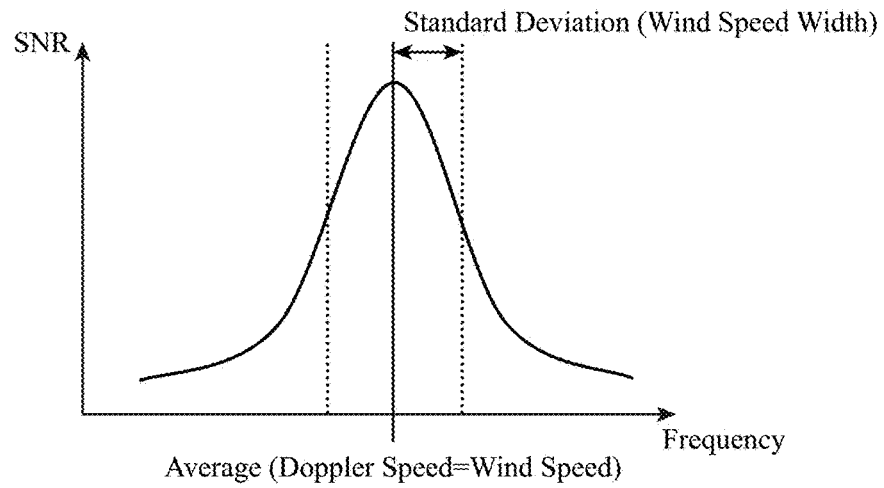
FIG. 16 is an explanatory drawing showing the concepts of a wind speed and a wind speed width which are derived from a reception spectrum.

The spectrum calculating unit 12 then performs an incoherent integration on the received signal after the Fourier transform N integration times, N being set up in advance, for each range bin i (refer to FIG. 15) to calculate a spectrum $SPC_i$ of the received signal (step ST2).

After the spectrum calculating unit 12 calculates the spectrum $SPC_i$ of the received signal, the SNR calculating unit 14 calculates an SNR which is a signal to noise ratio for each range bin i by dividing the spectrum $SPC_i$ of the received signal by the spectrum of the noise signal stored in the noise signal storage unit 13 (step ST3).

After the SNR calculating unit 14 calculates the SNR, the peak SNR detecting unit 15 detects a peak SNR which is a peak value of the SNR for each range bin i (step ST4).

After the peak SNR detecting unit 15 detects a peak SNR, the speed calculating unit 16 selects a speed calculation method corresponding to the peak SNR for each range bin i from among the plurality of speed calculation methods of calculating the speed (wind speed) of an aerosol (e.g., the peak detection method, the centroid calculation method, and the maximum likelihood estimation method) (step ST5), and calculates the speed (wind speed) of the aerosol according to the speed calculation method (step ST6).

Hereafter, the details of processing performed by the speed calculating unit 16 will be explained concretely.

When receiving a command for giving a higher priority to the calculation rate of the speed than to the calculation accuracy of the speed from the user, the speed calculating unit 16 performs the process shown in FIG. 5 to calculate the speed (wind speed) of the aerosol.

In contrast, when receiving a command for giving a higher priority to the calculation accuracy of the speed than to the calculation rate of the speed from the user, the speed calculating unit performs the process shown in FIG. 6 to calculate the speed (wind speed) of the aerosol.

First, the details of processing at the time when receiving a command for giving a higher priority to the calculation rate of the speed than to the calculation accuracy of the speed from the user will be explained.

When receiving the command for giving a higher priority to the calculation rate of the speed than to the calculation accuracy of the speed from the user, the SNR determining unit 21 of the speed calculating unit 16 compares a peak SNR detected by the peak SNR detecting unit 15 with the reference peak value $P_{REF}$ for each range bin i (step ST11 of FIG. 5).

If the peak SNR is higher than the reference peak value $P_{REF}$ (peak SNR>$P_{REF}$), the SNR determining unit 21 selects, as the speed calculation method, the "peak detection method" whose calculation time is shorter than that of the maximum likelihood estimation method because the SNR of the received signal is sufficiently high and the speed (wind speed) of the aerosol can be calculated with a high degree of accuracy even if the "maximum likelihood estimation method" is not selected as the speed calculation method (step ST12).

In contrast, if the peak SNR is equal to or lower than the reference peak value $P_{REF}$ (peak SNR≤$P_{REF}$), the SNR determining unit selects the "maximum likelihood estimation method" as the speed calculation method (step ST13). More specifically, because even when a higher priority is given to the calculation rate of the speed, the wind speed may not be able to be calculated with a high degree of accuracy if the "peak detection method" is selected as the speed calculation method under circumstances where the peak SNR is low, the "maximum likelihood estimation method" is selected as the speed calculation method.

After the SNR determining unit 21 selects the "peak detection method" as the speed calculation method for the range bin i in question, the peak detection processing unit 22 calculates the wind speed $v_d$ which is the speed of the aerosol from a frequency $f_d$ corresponding to the peak SNR detected by the peak SNR detecting unit 15 (step ST14).

$$v_d = f_d \lambda \quad (1)$$

In this equation (1), λ denotes the wavelength.

After the SNR determining unit 21 selects the "maximum likelihood estimation method" as the speed calculation method for the range bin i in question, the maximum likelihood estimation processing unit 24 makes variable the parameter of the waveform model of the reception spectrum prepared in advance, and searches for a parameter with the highest correlation with the spectrum of the received signal calculated by the spectrum calculating unit 12.

For example, if it is assumed that the transmission waveform of the laser light has a normal distribution and the received waveform of the laser light also has a normal distribution, when the amplitude is denoted by A, the average Doppler speed is denoted by $\mu_d$, and the wind speed width is denoted by $\sigma_d$, the model of the spectrum of the received signal is expressed by the following equation (2).

$$p(f, A, \mu_d, \sigma_d) = -\frac{A}{\sqrt{2\pi}\,\sigma_d}\exp\left\{-\frac{(f-\mu_d)^2}{2\sigma_d^2}\right\} \quad (2)$$

In the equation (2), the amplitude A, the average Doppler speed $\mu_d$, and the wind speed width $\sigma_d$ which are parameters of the model are made to be variable, and a least square error L (equivalent to a likelihood) shown by the following equation (3) is calculated.

$$L = \Sigma\{S(f) - p(f, A, \mu_d, \sigma_d)\}^2 \quad (3)$$

In this equation (3), the parameters (the amplitude A, the average Doppler speed $\mu_d$, and the wind speed width $\sigma_d$) at the time when the least square error L is a minimum are the ones which can imitate the received signal most likely.

In this embodiment, the value range of the wind speed width $\sigma_d$ and that of the average Doppler speed $\mu_d$ are as follows.

$$1/\omega \leq \sigma_d \leq K \times (1/\omega)$$

ω denotes a transmission pulse width, and K denotes the number of air quantities which are assumed to be included in the range bin.

$$0 < \mu_d \leq f_w$$

$f_w$ denotes a Doppler frequency which is determined by an assumed wind speed, and is determined by the user according to an environment where the device is installed and performs measurements.

After specifying the parameters (the amplitude A, the average Doppler speed $\mu_d$, and the wind speed width $\sigma_d$) which can imitate the received signal most likely, the maximum likelihood estimation processing unit 24 calculates the wind speed $v_d$ which is the speed of the aerosol by substituting, as the frequency $f_d$, a frequency corresponding to the average Doppler speed $\mu_d$ into the above-mentioned equation (1) (step ST15).

Although the example of also making variable the amplitude A is shown above, when it is seemed that no clutter exists (e.g., at a time of fine weather), for example, the spectrum $SPC_i$ of the received signal can be normalized by using the largest spectrum of the received signal, and a maximum likelihood estimation can be performed on the normalized spectrum $SPC_i$, thereby being able to reduce the calculator cost.

Next, the details of processing at the time when receiving a command for giving a higher priority to the calculation accuracy of the speed than to the calculation rate of the speed from the user will be explained.

When receiving the command for giving a higher priority to the calculation accuracy of the speed than to the calculation rate of the speed from the user, the SNR determining unit 21 of the speed calculating unit 16 compares a peak SNR detected by the peak SNR detecting unit 15 with the reference peak value $P_{REF}$ for each range bin i (step ST21 of FIG. 6).

If the peak SNR is higher than the reference peak value $P_{REF}$ (peak SNR>$P_{REF}$), the SNR determining unit 21 selects, as the speed calculation method, the "centroid calculation method" whose calculation time is shorter than that of the maximum likelihood estimation method because the SNR of the received signal is sufficiently high and the speed (wind speed) of the aerosol can be calculated with a high degree of accuracy even if the "maximum likelihood estimation method" is not selected as the speed calculation method (step ST22).

In contrast, if the peak SNR is equal to or lower than the reference peak value $P_{REF}$ (peak SNR≤$P_{REF}$), the SNR determining unit selects the "maximum likelihood estimation method" as the speed calculation method (step ST23). More specifically, because even when a higher priority is given to the calculation rate of the speed, the wind speed may not be able to be calculated with a high degree of accuracy if the "maximum likelihood estimation method" is selected as the speed calculation method under circumstances where the peak SNR is low, the "centroid calculation method" or the "peak detection method" is selected as the speed calculation method.

Figure 17:
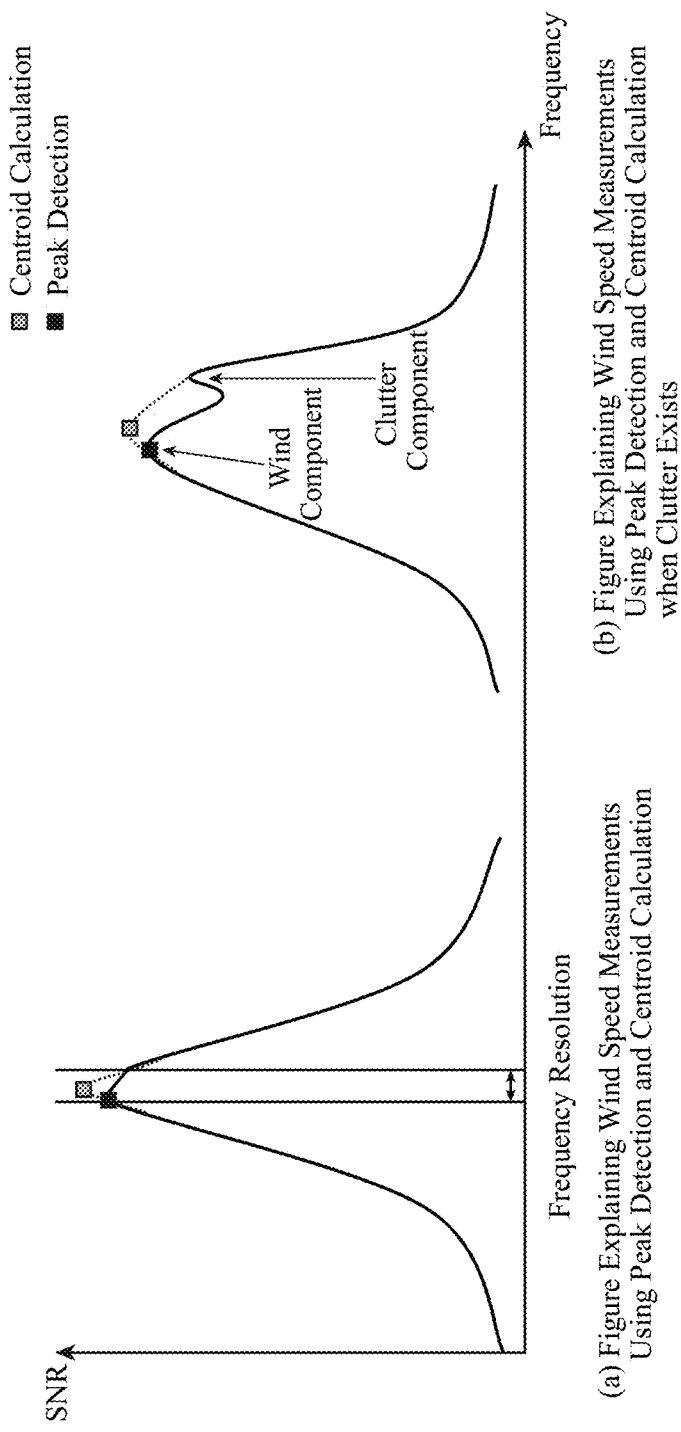
FIG. 17 is an explanatory drawing explaining the merits and demerits of a wind measurement using a peak detection method and those of a wind measurement using a centroid calculation method.
Figure 18:
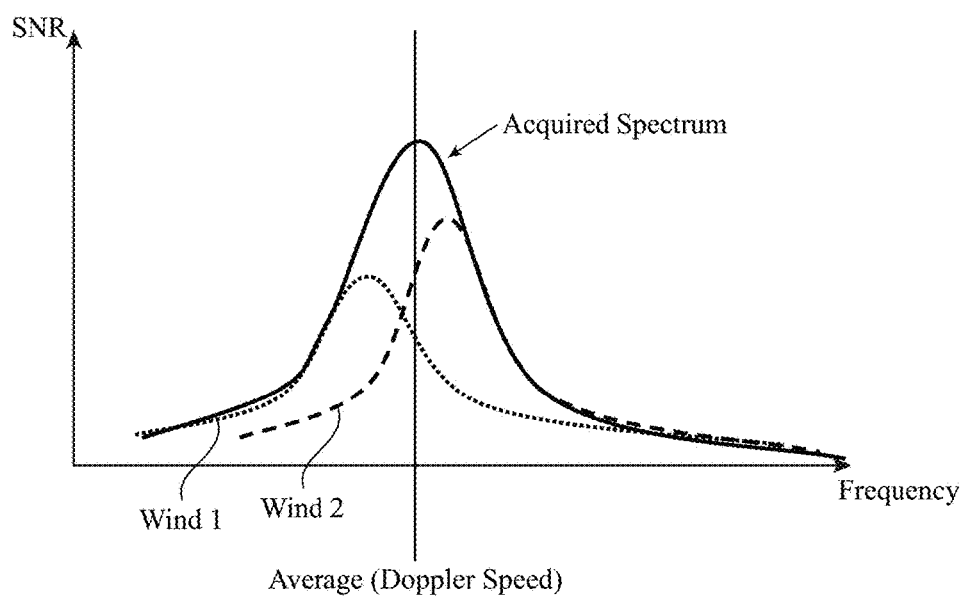
FIG. 18 is an explanatory drawing explaining a wind measurement of a plurality of winds using a maximum likelihood estimation method.

After the SNR determining unit 21 selects the "centroid calculation method" as the speed calculation method for the range bin i in question, the centroid calculation processing unit 23 calculates the center of gravity of one or more peaks SNR detected by the peak SNR detecting unit 15 (in the example of FIG. 17(b), because a peak SNR for wind components and a peak SNR for clutter components are calculated by the peak SNR detecting unit 15, the center of gravity of the two peak SNRs is calculated).

After calculating the center of gravity of one or more peak SNRs, the centroid calculation processing unit 23 calculates the wind speed $v_d$ which is the speed of the aerosol by substituting, as the frequency $f_d$, a frequency corresponding to the center of gravity into the above-mentioned equation (1) (step ST24).

The frequency $f_d$ corresponding to the center of gravity is shown as in the following equation (4).

$$f_d = \frac{\int S(f) f}{\int S(f)} \quad (4)$$

In this equation (4), S(f) denotes the spectrum $SPC_i$ of the received signal and f denotes the frequency corresponding to the spectrum $SPC_i$, and the spectrum $SPC_i$ is weighted with the frequency f.

After the SNR determining unit 21 selects the "maximum likelihood estimation method" as the speed calculation method for the range bin i in question, the maximum likelihood estimation processing unit 24 calculates the wind speed $v_d$ which is the speed of the aerosol, like in the case of giving a higher priority to the calculation rate of the speed (step ST25).

As can be seen from the above description, because the laser radar device in accordance with this Embodiment 1 is constructed in such a way that the speed calculating unit 16 selects a speed calculation method of calculating the speed (wind speed) of an aerosol from both a peak SNR detected by the peak SNR detecting unit 15 and information showing to which one of the calculation rate of the speed and the calculation accuracy of the speed a higher priority is given from among the plurality of speed calculation methods of calculating the speed (wind speed) of an aerosol, and calculates the speed (wind speed) of an aerosol according to the speed calculation method, there is provided an advantage of being able to calculate the speed (wind speed) of an aerosol in a short time with a high degree of accuracy.

More specifically, because the "peak detection method" or the "centroid calculation method" whose processing time is short is selected as the speed calculation method under circumstances where a peak SNR detected by the peak SNR detecting unit 15 is high, and therefore the speed (wind speed) of an aerosol can be calculated with a high degree of accuracy even if the "maximum likelihood estimation method" is not selected as the speed calculation method, the speed (wind speed) of the aerosol can be calculated in a short time with a high degree of accuracy.

In contrast, because the "maximum likelihood estimation method" is selected as the speed calculation method under circumstances where a peak SNR detected by the peak SNR detecting unit 15 is low, and therefore the speed (wind speed) of an aerosol cannot be calculated with a high degree of accuracy if the "maximum likelihood estimation method" is not selected as the speed calculation method, the speed (wind speed) of the aerosol can be calculated with a high degree of accuracy even if the peak SNR is low.

Although in this Embodiment 1 the case of receiving a command for giving a higher priority to the calculation rate of the speed than to the calculation accuracy of the speed from the user, and the case of receiving a command for giving a higher priority to the calculation accuracy of the speed than to the calculation rate of the speed from the user are shown, a speed calculation method can be selected in response to another command (e.g., a command for giving a higher priority to a distance resolution) from the user.

Embodiment 2

Figure 7:
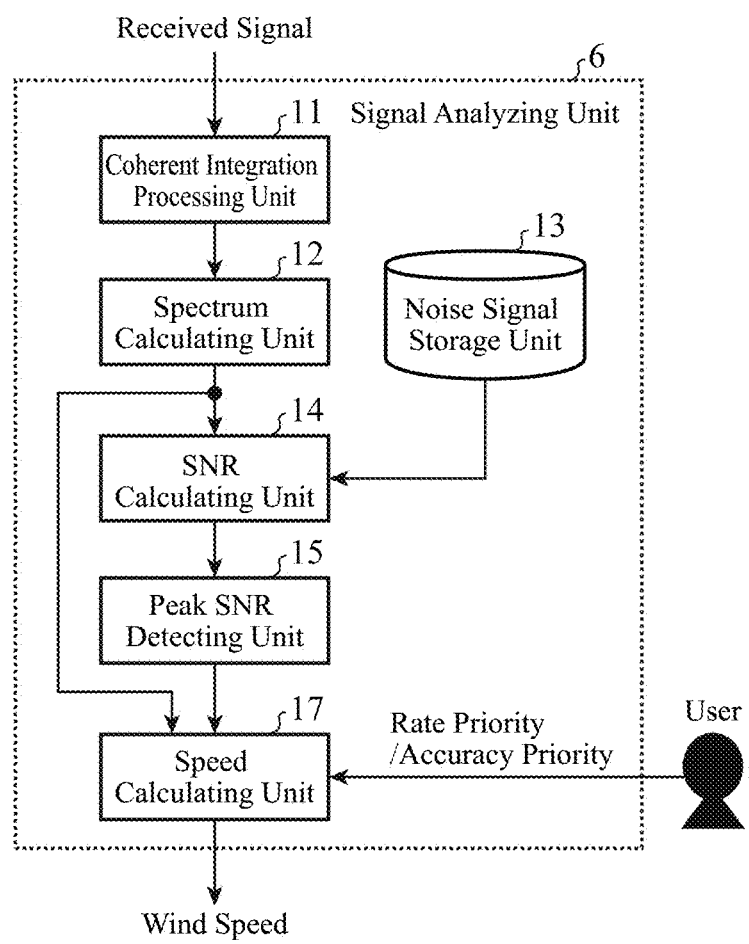
FIG. 7 is a structural diagram showing a signal analyzing unit 6 of a laser radar device in accordance with Embodiment 2 of the present invention.

FIG. 7 is a structural diagram showing a signal analyzing unit 6 of a laser radar device in accordance with Embodiment 2 of the present invention. In the figure, because the same reference numerals as those shown in FIG. 2 denote the same components or like components, the explanation of the components will be omitted hereafter.

A speed calculating unit 17 performs a process of calculating a wind speed width $S_w$ which is a speed width of an aerosol from a spectrum $SPC_i$ of a received signal which is calculated by a spectrum calculating unit 12, selecting a speed calculation method corresponding to both a peak SNR detected by a peak SNR detecting unit 15 and the wind speed width $S_w$ from among a plurality of speed calculation methods of calculating the speed (wind speed) of the aerosol (e.g., a peak detection method, a centroid calculation method, and a maximum likelihood estimation method), and calculating the speed (wind speed) of the aerosol according to the speed calculation method. The speed calculating unit 17 constructs a speed calculator.

Figure 8:
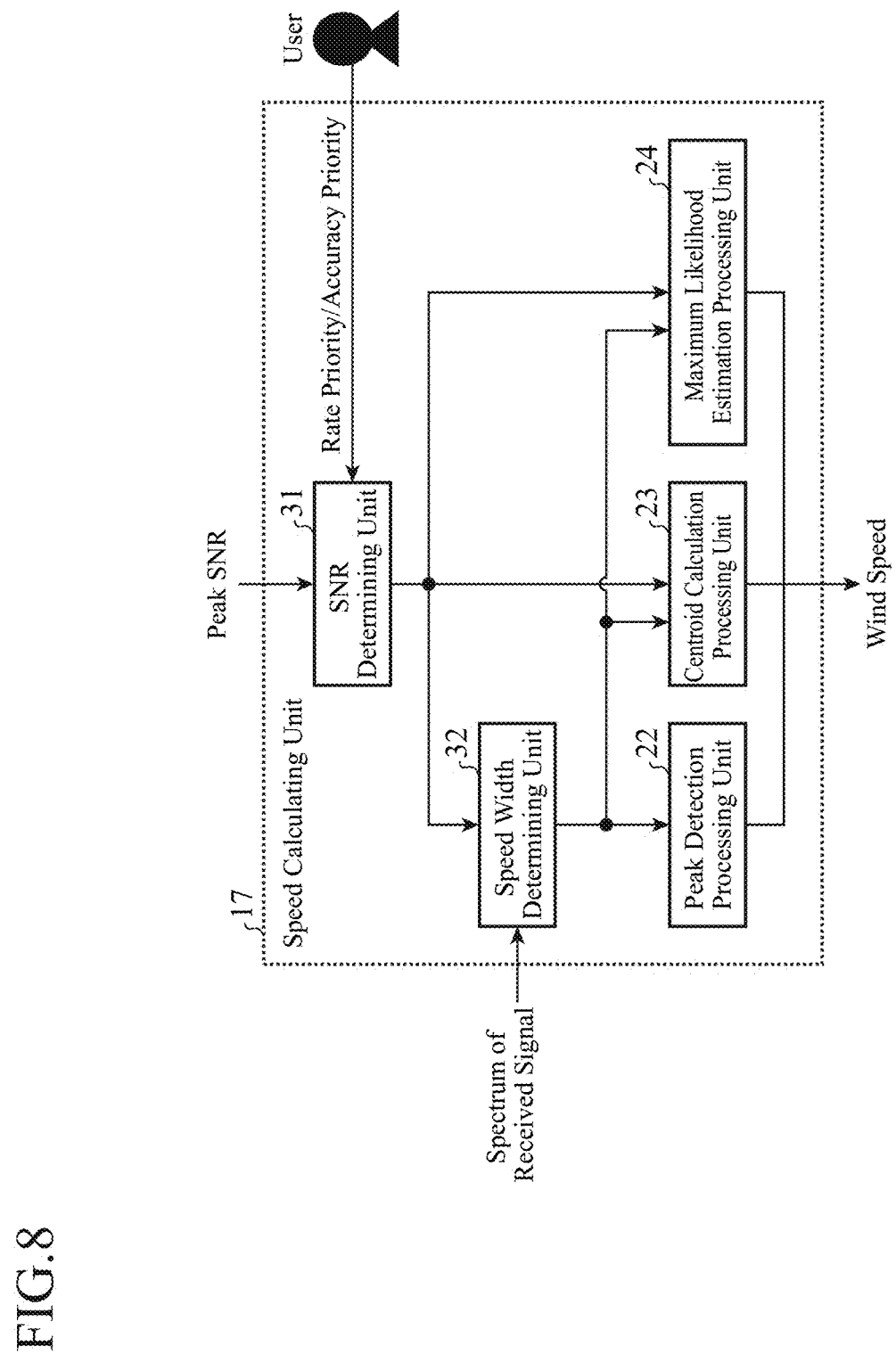
FIG. 8 is a structural diagram showing a speed calculating unit 17 in the signal analyzing unit 6.

FIG. 8 is a structural diagram showing the speed calculating unit 17 in the signal analyzing unit 6. In the figure, because the same reference numerals as those shown in FIG. 4 denote the same components or like components, the explanation of the components will be omitted hereafter.

A threshold $T_{SNR2}$ is set as a reference peak value in addition to a threshold $T_{SNR1}$ being set up in advance ($T_{SNR1}>T_{SNR2}$) When receiving a command for giving a higher priority to the calculation rate of the speed than to the calculation accuracy of the speed from a user, an SNR determining unit 31 performs a process of selecting the "centroid calculation method" as the speed calculation method if a peak SNR detected by the peak SNR detecting unit 15 is higher than the threshold $T_{SNR2}$ and is equal to or lower than the threshold $T_{SNR1}$ ($T_{SNR2}<$peak SNR$\leq T_{SNR1}$) or selecting the "maximum likelihood estimation method" as the speed calculation method if the peak SNR is equal to or lower than the threshold $T_{SNR2}$ (peak SNR$\leq T_{SNR2}$).

In contrast, when receiving a command for giving a higher priority to the calculation accuracy of the speed than to the calculation rate of the speed from the user, the SNR determining unit 31 performs a process of selecting the "maximum likelihood estimation method" as the speed calculation method if the peak SNR is equal to or lower than the threshold $T_{SNR1}$ (peak SNR$\leq T_{SNR1}$).

A speed width determining unit 32 performs a process of calculating a wind speed width $S_w$ from the spectrum $SPC_i$ of the received signal calculated by the spectrum calculating unit 12.

Further, a threshold $Tw_{min}$ is set as a reference speed width in addition to a threshold $Tw_{max}$ being set up in advance ($Tw_{max}>Tw_{min}$). When receiving a command for giving a higher priority to the calculation rate of the speed than to the calculation accuracy of the speed from the user, the speed width determining unit 32 performs a process of, when a peak SNR detected by the peak SNR detecting unit 15 is higher than the threshold $T_{SNR1}$, selecting the "peak detection method" as the speed calculation method if the wind speed width $S_w$ is wider than the threshold $Tw_{max}$ ($S_w > Tw_{max}$), or selecting the "centroid calculation method" as the speed calculation method if the wind speed width $S_w$ is equal to or narrower than the threshold $Tw_{max}$ ($Tw_{min} \leq S_w \leq Tw_{max}$).

In contrast, when receiving a command for giving a higher priority to the calculation accuracy of the speed than to the calculation rate of the speed from the user, the speed width determining unit 32 performs a process of, when a peak SNR detected by the peak SNR detecting unit 15 is higher than the threshold $T_{SNR1}$, selecting the "maximum likelihood estimation method" as the speed calculation method if the wind speed width $S_w$ is wider than the threshold $Tw_{max}$ ($S_w > Tw_{max}$), or selecting the "centroid calculation method" as the speed calculation method if the wind speed width $S_w$ is equal to or narrower than the threshold $Tw_{max}$ ($Tw_{min} \leq S_w \leq Tw_{max}$).

The thresholds $T_{SNR1}$ and $T_{SNR2}$ in the SNR determining unit 31 and the thresholds $Tw_{max}$ and $Tw_{min}$ in the speed width determining unit 32 can be predetermined by, for example, the user, or values based on a model calculation disclosed by above-mentioned nonpatent reference 2 can be used as the thresholds.

Figure 9:
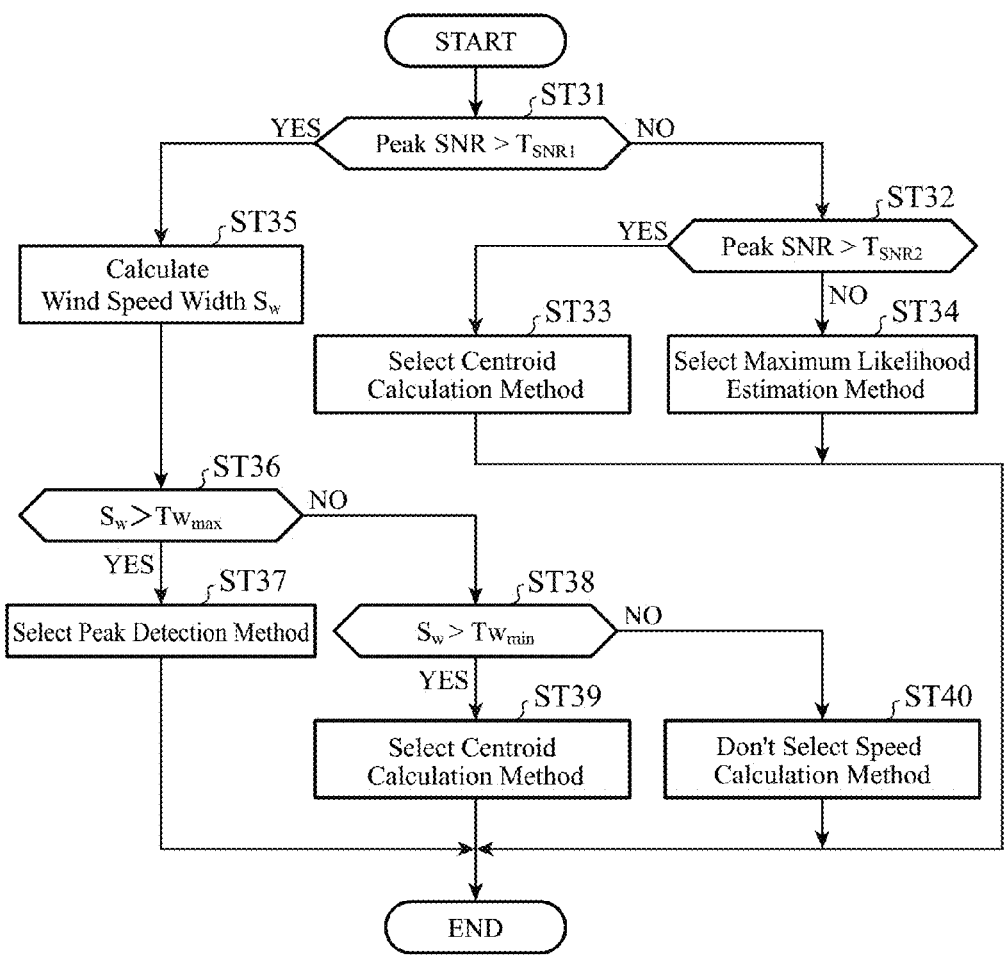
FIG. 9 is a flowchart showing the details of processing performed by the speed calculating unit 17 when a higher priority is given to the calculation rate of the speed than to the calculation accuracy of the speed.

FIG. 9 is a flow chart showing a part of the details of processing performed by the speed calculating unit 17 when a higher priority is given to the calculation rate of the speed than to the calculation accuracy of the speed.

Figure 10:
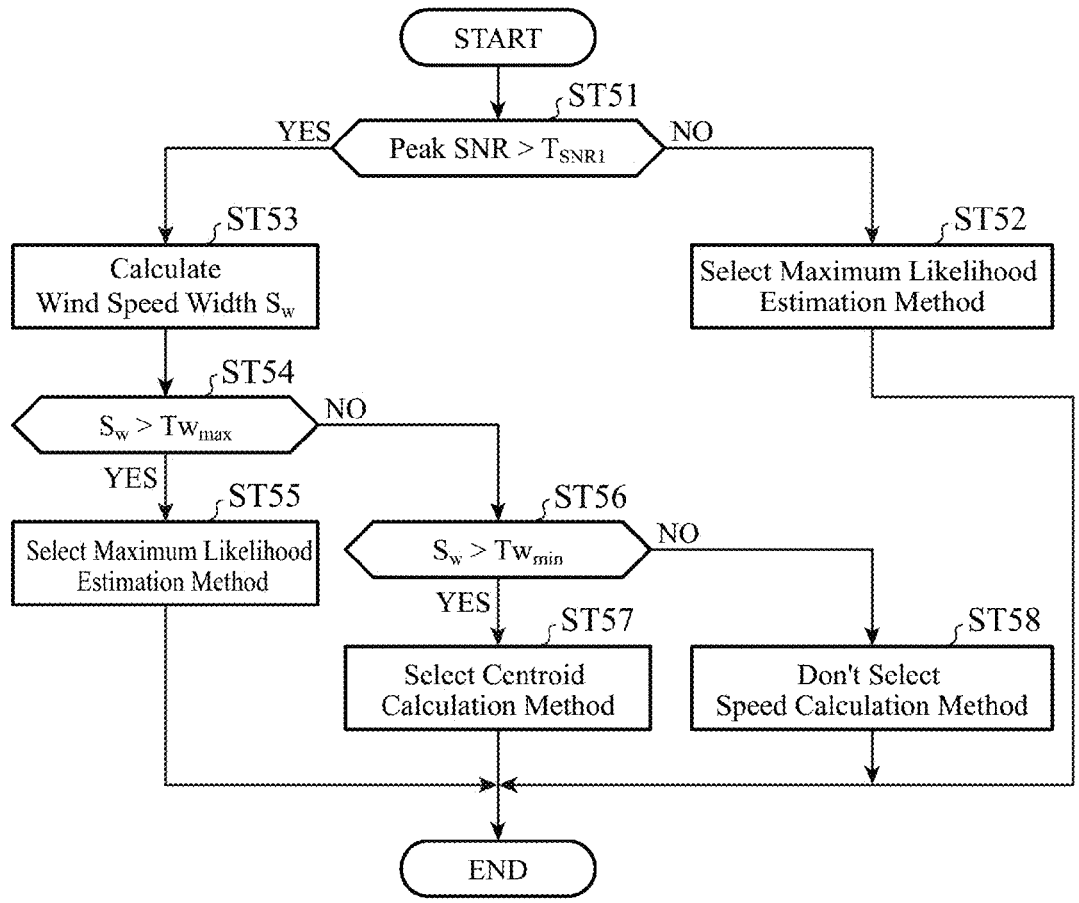
FIG. 10 is a flow chart showing the details of processing performed by the speed calculating unit 17 when a higher priority is given to the calculation accuracy of the speed than to the calculation rate of the speed.

FIG. 10 is a flow chart showing a part of the details of processing performed by the speed calculating unit 17 when a higher priority is given to the calculation accuracy of the speed than to the calculation rate of the speed.

Next, the operation of the laser radar device will be explained.

First, when an optical oscillation unit 2 of a light transmitting and receiving unit 1 oscillates laser light, the laser light is emitted into atmospheric air by way of an optical system 3.

The laser light emitted into the atmospheric air is reflected by an aerosol existing in the atmospheric air, and a reflected part of the laser light is focused by the optical system 3 of the light transmitting and receiving unit 1.

A laser light detecting unit 4 of the light transmitting and receiving unit 1 receives the laser light focused by the optical system 3, converts the waveform of the laser light into an electric signal, and outputs the electric signal to a signal processing unit 5 as a received signal.

When receiving the received signal from the light transmitting and receiving unit 1, the signal analyzing unit 6 of the signal processing unit 5 calculates the speed (wind speed) of the aerosol by analyzing the received signal, and displays the wind speed which is the calculation result on a display and storage unit 7.

Hereafter, the details of processing performed by the signal analyzing unit 6 will be explained concretely.

When receiving the received signal from the light transmitting and receiving unit 1, a coherent integration processing unit 11 of the signal analyzing unit 6 performs a coherent integration on the received signal for each range bin i (i=1, 2, . . . , M), and outputs the received signal after the coherent integration to a spectrum calculating unit 12 (refer to FIG. 14), like that according to above-mentioned Embodiment 1.

When receiving the received signal after the coherent integration from the coherent integration processing unit 11, the spectrum calculating unit 12 performs a Fourier transform on the received signal after the coherent integration for each range bin i, like that according to above-mentioned Embodiment 1.

The spectrum calculating unit 12 then performs an incoherent integration on the received signal after the Fourier transform N integration times, N being set up in advance, for each range bin i (refer to FIG. 15) to calculate a spectrum $SPC_i$ of the received signal.

After the spectrum calculating unit 12 calculates the spectrum $SPC_i$ of the received signal, an SNR calculating unit 14 calculates an SNR which is a signal to noise ratio for each range bin i by dividing the spectrum $SPC_i$ of the received signal by a spectrum of a noise signal stored in a noise signal storage unit 13, like that according to above-mentioned Embodiment 1.

After the SNR calculating unit 14 calculates the SNR, the peak SNR detecting unit 15 detects a peak SNR which is a peak value of the SNR for each range bin i, like that according to above-mentioned Embodiment 1.

After the spectrum calculating unit 12 calculates the spectrum $SPC_i$ of the received signal and the peak SNR detecting unit 15 detects a peak SNR, the speed calculating unit 17 calculates a wind speed width $S_w$ which is a speed width of the aerosol from the spectrum $SPC_i$ of the received signal for each range bin i.

After calculating the wind speed width $S_w$, the speed calculating unit 17 selects a speed calculation method corresponding to both the peak SNR and the wind speed width $S_w$ from among the plurality of speed calculation methods of calculating the speed (wind speed) of an aerosol (e.g., the peak detection method, the centroid calculation method, and the maximum likelihood estimation method), and calculates the speed (wind speed) of the aerosol according to the speed calculation method.

Hereafter, the details of processing performed by the speed calculating unit 17 will be explained concretely.

When receiving a command for giving a higher priority to the calculation rate of the speed than to the calculation accuracy of the speed from the user, the speed calculating unit 17 performs the process shown in FIG. 9 to calculate the speed (wind speed) of the aerosol.

In contrast, when receiving a command for giving a higher priority to the calculation accuracy of the speed than to the calculation rate of the speed from the user, the speed calculating unit performs the process shown in FIG. 10 to calculate the speed (wind speed) of the aerosol.

First, the details of processing at the time when receiving a command for giving a higher priority to the calculation rate of the speed than to the calculation accuracy of the speed from the user will be explained.

When receiving the command for giving a higher priority to the calculation rate of the speed than to the calculation accuracy of the speed from the user, the SNR determining unit 31 of the speed calculating unit 17 compares a peak SNR detected by the peak SNR detecting unit 15 with the threshold value $T_{SNR1}$ for each range bin i (step ST31 of FIG. 9).

Figure 11:
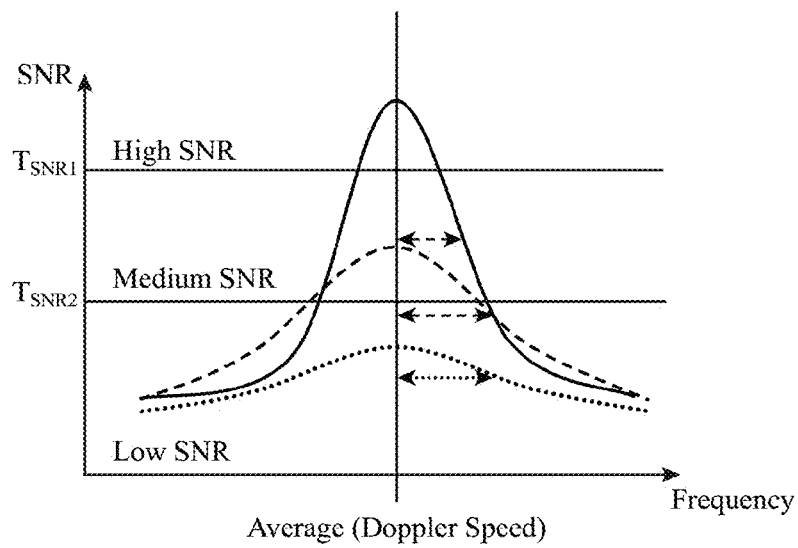
FIG. 11 is an explanatory drawing showing SNR determination in an SNR determining unit 31.

FIG. 11 is an explanatory drawing showing the SNR determination in the SNR determining unit 31.

When the peak SNR is higher than the threshold $T_{SNR1}$ (peak SNR > $T_{SNR1}$), the SNR determining unit 31 commands the speed width determining unit 32 to select the "peak detection method" or the "centroid calculation method" whose calculation time is shorter than that of the maximum likelihood estimation method because the SNR of the received signal is sufficiently high and the speed (wind speed) of the aerosol can be calculated with a high degree of accuracy even if the "maximum likelihood estimation method" is not selected as the speed calculation method, as shown in FIG. 11.

When the peak SNR is equal to or lower than the threshold $T_{SNR1}$ (peak SNR≤$T_{SNR1}$), SNR determining unit 31 compares the peak SNR with the threshold $T_{SNR2}$ (step ST32).

When the peak SNR is higher than the threshold $T_{SNR2}$ ($T_{SNR2}$<peak SNR≤$T_{SNR1}$), the SNR determining unit 31 selects the "centroid calculation method" as the speed calculation method because the SNR of the received signal has a middle value and there is a possibility that the speed (wind speed) of the aerosol can be calculated with a high degree of accuracy even if the "maximum likelihood estimation method" is not selected as the speed calculation method, but the speed (wind speed) of the aerosol cannot be calculated with a high degree of accuracy if the "peak detection method" is selected as the speed calculation method, as shown in FIG. 11 (step ST33).

In contrast, when the peak SNR is equal to or lower than the threshold $T_{SNR2}$ (peak SNR≤$T_{SNR2}$), the SNR determining unit selects the "maximum likelihood estimation method" as the speed calculation method because the SNR of the received signal is low and there is a possibility that the speed (wind speed) of the aerosol cannot be calculated with a high degree of accuracy unless the "maximum likelihood estimation method" having a high degree of calculation accuracy is selected as the speed calculation method, as shown in FIG. 11 (step ST34).

When receiving a selection command for selecting the "peak detection method" or the "centroid calculation method" from the SNR determining unit 31, the speed width determining unit 32 calculates a wind speed width $S_w$ from the spectrum $SPC_i$ of the received signal calculated by the spectrum calculating unit 12 for each range bin i, as shown in the following equation (5) (step ST35). The equation (5) is disclosed in, for example, nonpatent reference 1.

$$S_w = \frac{\int S(f)f^2 df}{\int S(f) df} \quad (5)$$

In this equation (5), S(f) denotes the spectrum $SPC_i$ of the received signal, and f denotes a frequency corresponding to the spectrum $SPC_i$.

In the case in which the SNR is high, the wind speed width $S_w$ can be derived by using a width at a point where the SNR has a lower value than the peak value by one-half of this peak value. In this case, the wind speed width can be derived with a smaller amount of calculations.

After calculating the wind speed width $S_w$, the speed width determining unit 32 compares the wind speed width $S_w$ with the threshold $Tw_{max}$ (step ST36).

If the wind speed width $S_w$ is wider than the threshold $Tw_{max}$ ($S_w$>$Tw_{max}$) the speed width determining unit 32 selects the "peak detection method" as the speed calculation method (step ST37).

If the wind speed width $S_w$ is equal to or narrower than the threshold $Tw_{max}$ ($S_w$≤$Tw_{max}$) the speed width determining unit 32 compares the wind speed width $S_w$ with the threshold $Tw_{min}$ (step ST38).

If the wind speed width $S_w$ is equal to or narrower than the threshold $Tw_{max}$, but is equal to or wider than the threshold $Tw_{min}$ ($Tw_{min}$≤$S_w$≤$Tw_{max}$), the speed width determining unit 32 selects the "centroid calculation method" as the speed calculation method (step ST39).

Because there is a possibility that the speed (wind speed) of the aerosol can be calculated with a high degree of accuracy even if any speed calculation method is selected if the wind speed width $S_w$ is narrower than the threshold $Tw_{min}$ ($S_w$<$Tw_{min}$), the speed width determining unit ends the process of calculating the speed (wind speed) of the aerosol without selecting any speed calculation method (step ST40).

In this embodiment, although the thresholds $Tw_{max}$ and $Tw_{min}$ in the speed width determining unit 32 can be determined in advance by the user, as mentioned above, the thresholds $Tw_{max}$ and $Tw_{min}$ can be set with respect to 1/ω, where a transmission pulse width is denoted by ω, because the spectrum $SPC_i$ of an ideal received signal is 1/ω.

For example, while the wind speed width $S_w$ is equal to or greater than $Tw_{max}$=2/ω when two or more types of winds are mixed, it can be determined that the reflected light is not the one from an aerosol, but is a clutter if the wind speed width $S_w$ is equal to or less than 2/ω.

When the thresholds $Tw_{max}$ and $Tw_{min}$ are set this way, the "peak detection method" whose calculation accuracy is not influenced greatly by the existence of a clutter is selected as the speed calculation method under circumstances where a clutter exists, while the "centroid calculation method" whose calculation accuracy is higher than that of the peak detection method is selected under circumstances where no clutter exists.

After the speed width determining unit 32 selects the "peak detection method" as the speed calculation method for the range bin i in question, a peak detection processing unit 22 calculates the wind speed $v_d$ which is the speed of the aerosol, like that according to above-mentioned Embodiment 1.

After the SNR determining unit 31 or the speed width determining unit 32 selects the "centroid calculation method" as the speed calculation method for the range bin i in question, a centroid calculation processing unit 23 calculates the wind speed $v_d$ which is the speed of the aerosol, like that according to above-mentioned Embodiment 1.

After the SNR determining unit 31 selects the "maximum likelihood estimation method" as the speed calculation method for the range bin i in question, a maximum likelihood estimation processing unit 24 calculates the wind speed $v_d$ which is the speed of the aerosol, like that according to above-mentioned Embodiment 1.

Next, the details of processing at the time of receiving a command for giving a higher priority to the calculation accuracy of the speed than to the calculation rate of the speed from the user will be explained.

When receiving the command for giving a higher priority to the calculation accuracy of the speed than to the calculation rate of the speed from the user, the SNR determining unit 31 of the speed calculating unit 17 compares a peak SNR detected by the peak SNR detecting unit 15 with the threshold $T_{SNR1}$ for each range bin i (step ST51 of FIG. 10).

When the peak SNR is equal to or lower than the threshold $T_{SNR1}$ (peak SNR≤$T_{SNR1}$), the SNR determining unit 31 selects the "maximum likelihood estimation method" as the speed calculation method because there is a possibility that the speed (wind speed) of the aerosol cannot be calculated with a high degree of accuracy unless the "maximum likelihood estimation method" having a high degree of calculation accuracy is selected (step ST52).

In contrast, when the peak SNR is higher than the threshold $T_{SNR1}$ (peak SNR>$T_{SNR1}$), the SNR determining unit commands the speed width determining unit 32 to select the "centroid calculation method" or the "maximum likelihood estimation method."

When receiving a selection command for selecting the "centroid calculation method" or the "maximum likelihood estimation method" from the SNR determining unit 31, the speed width determining unit 32 calculates a wind speed width $S_w$ from the spectrum $SPC_i$ of the received signal calculated by the spectrum calculating unit 12 for each range bin i, like in the case of giving a higher priority to the calculation rate of the speed (step ST53).

After calculating the wind speed width $S_w$, the speed width determining unit 32 compares the wind speed width $S_w$ with the threshold $Tw_{max}$ (step ST54).

If the wind speed width $S_w$ is wider than the threshold $Tw_{max}$ ($S_w$>$Tw_{max}$), the speed width determining unit 32 selects the "maximum likelihood estimation method" as the speed calculation method because there is a possibility that the speed (wind speed) of the aerosol cannot be calculated with a high degree of accuracy unless the "maximum likelihood estimation method" having a high degree of calculation accuracy is selected (step ST55).

If the wind speed width $S_w$ is equal to or narrower than the threshold $Tw_{max}$ ($S_w \leq Tw_{max}$) the speed width determining unit 32 compares the wind speed width $S_w$ with the threshold $Tw_{min}$ (step ST56).

If the wind speed width $S_w$ is equal to or narrower than the threshold $Tw_{max}$, but is equal to or wider than the threshold $Tw_{min}$ ($Tw_{min} \leq S_w \leq Tw_{max}$) the speed width determining unit 32 selects the "centroid calculation method" whose calculation time is shorter than that of the maximum likelihood estimation method because the speed (wind speed) of the aerosol can be calculated with a high degree of accuracy even if the "maximum likelihood estimation method" is not selected as the speed calculation method (step ST57).

If the wind speed width $S_w$ is narrower than the threshold $Tw_{min}$ ($S_w$<$Tw_{min}$), the speed calculating unit ends the process of calculating the speed (wind speed) of the aerosol without selecting any speed calculation method because there is a low possibility that the speed (wind speed) of the aerosol can be calculated with a high degree of accuracy even if any speed calculation method is selected (step ST58).

After the speed width determining unit 32 selects the "centroid calculation method" as the speed calculation method for the range bin i in question, the centroid calculation processing unit 23 calculates the wind speed $v_d$ which is the speed of the aerosol, like that according to above-mentioned Embodiment 1.

After the SNR determining unit 31 or the speed width determining unit 32 selects the "maximum likelihood estimation method" as the speed calculation method for the range bin i in question, the maximum likelihood estimation processing unit 24 calculates the wind speed $v_d$ which is the speed of the aerosol, like that according to above-mentioned Embodiment 1.

As can be seen from the above description, because the speed calculating unit 17 in accordance with this Embodiment 2 is constructed in such a way as to calculate a wind speed width $S_w$ which is a speed width of an aerosol from a spectrum $SPC_i$ of a received signal which is calculated by the spectrum calculating unit 12, selecting a speed calculation method corresponding to both a peak SNR and the wind speed width $S_w$ from among the plurality of speed calculation methods of calculating the speed (wind speed) of an aerosol (e.g., the peak detection method, the centroid calculation method, and the maximum likelihood estimation method), and calculate the speed (wind speed) of the aerosol according to the speed calculation method, there is provided an advantage of being able to select an optimal speed calculation method more strictly compared with above-mentioned Embodiment 1.

Embodiment 3

Although the example of selecting the "maximum likelihood estimation method" as the speed calculation method when a peak SNR is low is shown in above-mentioned Embodiments 1 and 2, the speed (wind speed) of an aerosol cannot be calculated with a high degree of accuracy when the SNR does not reach a desired SNR even if the "maximum likelihood estimation method" is selected as the speed calculation method.

To solve this problem, in accordance with this Embodiment 3, a laser radar device is enabled to calculate the speed (wind speed) of an aerosol with a high degree of accuracy even when the SNR does not reach a desired SNR.

More specifically, in accordance with this Embodiment 3, when the SNR does not reach a desired SNR, the number of integrations of an incoherent integration performed by a spectrum calculating unit 12 is increased so as to improve the accuracy of wind speed calculation.

Figure 12:
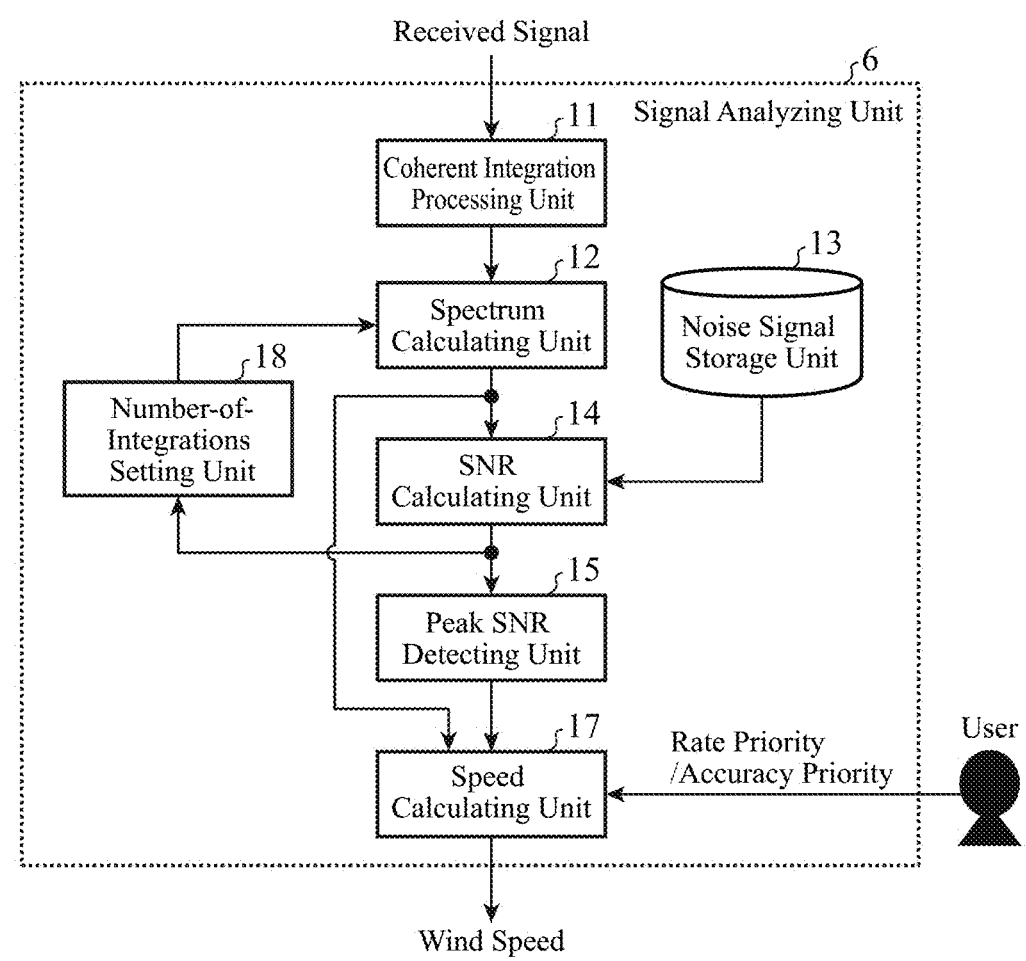
FIG. 12 is a structural diagram showing a signal analyzing unit 6 of a laser radar device in accordance with Embodiment 3 of the present invention.

FIG. 12 is a structural diagram showing a signal analyzing unit 6 of the laser radar device in accordance with Embodiment 3 of the present invention. In the figure, because the same reference numerals as those shown in FIG. 7 denote the same components or like components, the explanation of the components will be omitted hereafter.

An number-of-integrations setting unit 18 performs a process of setting up the number N of integrations of the incoherent integration performed by the spectrum calculating unit 12 according to an SNR calculated by an SNR calculating unit 14. The number-of-integrations setting unit 18 constructs a number-of-integrations setter.

Figure 13:
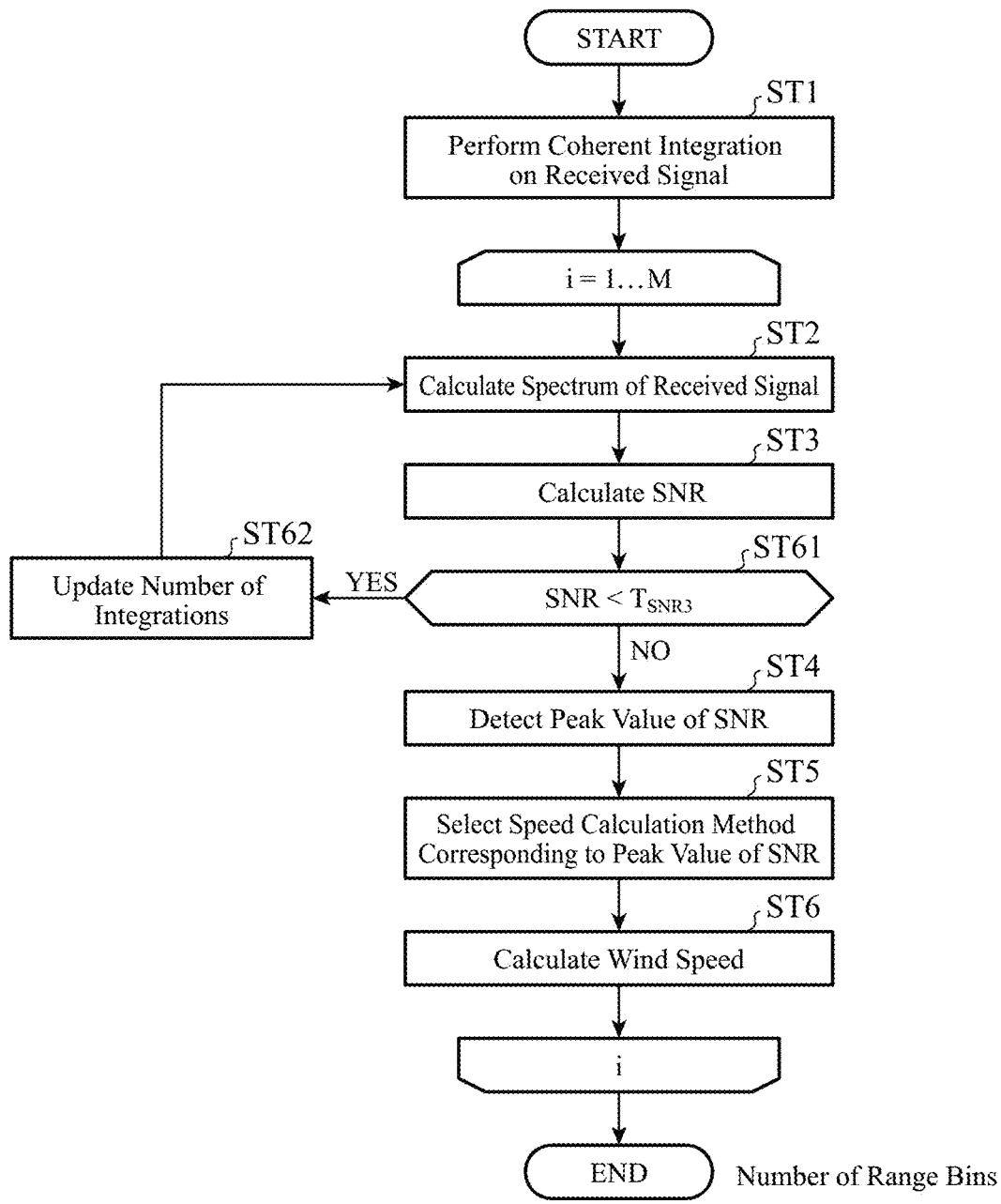
FIG. 13 is a flow chart showing the details of processing (a method of calculating the speed of an object to be measured) performed by the signal analyzing unit 6 of the laser radar device in accordance with Embodiment 3 of the present invention.

FIG. 13 is a flowchart showing the details of processing (a method of calculating the speed of an object to be measured) performed by the signal analyzing unit 6 of the laser radar device in accordance with Embodiment 3 of the present invention.

In above-mentioned Embodiments 1 and 2, the spectrum calculating unit 12 calculates a spectrum $SPC_i$ of a received signal by performing an incoherent integration on the received signal after a Fourier transform N integration times, N being set up in advance, for each range bin i. The spectrum calculating unit 12 in accordance with this Embodiment 3 differs from that in accordance with any one of above-mentioned Embodiments 1 and 2 in that the spectrum calculating unit calculates a spectrum $SPC_i$ of the received signal by performing an incoherent integration on the received signal after the Fourier transform N integration times, N being set up by the number-of-integrations setting unit 18.

Hereafter, the details of processing performed by the number-of-integrations setting unit 18 and the spectrum calculating unit 12 will be explained concretely.

However, because components other than the number-of-integrations setting unit 18 and the spectrum calculating unit 12 are the same as those according to any one of above-mentioned Embodiments 1 and 2, a detailed explanation of the components will be omitted hereafter.

When receiving the received signal after the coherent integration from a coherent integration processing unit 11, the spectrum calculating unit 12 performs a Fourier transform on the received signal after the coherent integration for each range bin i, like that according to any one of above-mentioned Embodiments 1 and 2.

Because no SNR is calculated by an SNR calculating unit 14 in a stage where the spectrum calculating unit 12 calculates the spectrum $SPC_i$ of the received signal for the first time, and the number-of-integrations setting unit 18 cannot set up the number N of integrations, the spectrum calculating unit 12 calculates the spectrum $SPC_i$ of the received signal by performing an incoherent integration on the received signal after the Fourier transform N integration times, N being set up in advance, for each range bin i (refer to FIG. 15) (step ST2 of FIG. 13).

After the spectrum calculating unit 12 calculates the spectrum $SPC_i$ of the received signal, the SNR calculating unit 14 calculates an SNR which is a signal to noise ratio for each range bin i by dividing the spectrum $SPC_i$ of the received signal by a spectrum of a noise signal stored in a noise signal storage unit 13, like that according to any one of above-mentioned Embodiments 1 and 2 (step ST3).

After the SNR calculating unit 14 calculates the SNR, the number-of-integrations setting unit 18 updates the number N of integrations which is set to the spectrum calculating unit 12 in advance (step ST62) when the SNR is lower than a threshold $T_{SNR3}$ which is required in order that a desired degree of calculation accuracy can be satisfied (e.g., $T_{SNR3} < T_{SNR2} < T_{SNR1}$) (step ST61).

More specifically, when the SNR calculated by the SNR calculating unit 14 is lower than the threshold $T_{SNR3}$ (SNR<$T_{SNR3}$), the number-of-integrations setting unit 18 sets up the number N of integrations of the incoherent integration performed by the spectrum calculating unit 12 according to the SNR.

Concretely, the number-of-integrations setting unit 18 prepares a table in which the number N of integrations corresponding to the SNR is described in advance, refers to the table to read the number N of integrations corresponding to the SNR calculated by the SNR calculating unit 14, and updates the number of integrations of the incoherent integration performed by the spectrum calculating unit 12 to the number N of integrations.

As an alternative, the number-of-integrations setting unit 18 can update the number N of integrations by, for example, performing an arithmetic operation shown by the following equation (6). However, the arithmetic operation shown by the equation (6) is an example and another arithmetic operation can be alternatively performed.

$$N = N + (T_{SNR1}/SNR)^2 \qquad (6)$$

Further, when a higher priority is given to the calculation accuracy of the speed, the number of integrations can be updated to the number N of integrations which falls within a data acquisition time period which is determined by (a processing time equal to or less than a desired wind speed calculation rate defined by the user+the number of integrations), and which is expected to provide the highest degree of wind speed calculation accuracy.

After the number-of-integrations setting unit 18 updates the number N of integrations of the incoherent integration, the spectrum calculating unit 12 performs an incoherent integration on the received signal after the Fourier transform N integration times, N being updated, for each range bin i to calculate a spectrum $SPC_i$ of the received signal again (step ST2).

After the spectrum calculating unit 12 calculates a spectrum $SPC_i$ of the received signal again, the SNR calculating unit 14 calculates an SNR which is a signal to noise ratio for each range bin i by dividing the spectrum $SPC_i$ of the received signal by the spectrum of the noise signal stored in the noise signal storage unit 13 (step ST3), like that according to any one of above-mentioned Embodiments 1 and 2.

When the SNR calculated by the SNR calculating unit 14 is equal to or higher than the threshold $T_{SNR3}$ (SNR≤$T_{SNR3}$) the peak SNR detecting unit 15 detects a peak SNR which is a peak value of the SNR for each range bin i (step ST4), like that according to any one of above-mentioned Embodiments 1 and 2.

After the spectrum calculating unit 12 calculates a spectrum $SPC_i$ of the received signal and the peak SNR detecting unit 15 detects a peak SNR, the speed calculating unit 17 calculates a wind speed width $S_w$ which is a speed width of the aerosol from the spectrum $SPC_i$ of the received signal for each range bin i, like that according to above-mentioned Embodiment 2.

After calculating the wind speed width $S_w$, the speed calculating unit 17 selects a speed calculation method corresponding to both the peak SNR and the wind speed width $S_w$ for each range bin i from the plurality of speed calculation methods of calculating the speed (wind speed) of an aerosol (e.g., the peak detection method, the centroid calculation method, and the maximum likelihood estimation method) (step ST5), and calculates the speed (wind speed) of the aerosol according to the speed calculation method (step ST5).

As can be seen from the above description, because the number-of-integrations setting unit 18 in accordance with this Embodiment 3 is constructed in such away as to set up the number N of integrations of the incoherent integration performed by the spectrum calculating unit 12 according to the SNR calculated by the SNR calculating unit 14, there is provided an advantage of being able to calculate the speed (wind speed) of an aerosol with a high degree of accuracy even when the SNR does not reach a desired SNR.

As a result, while a measurement of the wind speed is carried out with stability, the accuracy of calculation of the wind speed for all the range bins can be equalized to hold variations in the data constant.

Accordingly, when, for example, detection of a gust of wind or a turbulence is carried out by means of matching using a statistic, the processing time required to perform the matching process can be reduced and erroneous detection which is caused due to a shortage of the statistic or instability can also be reduced when the SNR is constant at all times.

Although the example in which the number-of-integrations setting unit 18 sets up the number N of integrations of the incoherent integration performed by the spectrum calculating unit 12 according to the SNR calculated by the SNR calculating unit 14 is shown in this Embodiment 3, the number of integrations of the coherent integration in the coherent integration processing unit 11 can be sets up and the coherent integration processing unit 11 can perform the coherent integration on the received signal the number of integrations which is set up by the number-of-integrations setting unit 18.

Further, although the example in which in a step in which the SNR calculating unit 14 calculates the SNR, the number-of-integrations setting unit 18 sets up the number N of integrations of the incoherent integration performed by the spectrum calculating unit 12 according to the SNR if the SNR is lower than the threshold $T_{SNR3}$ is shown in this Embodiment 3, the time that the number-of-integrations setting unit 18 sets up the number N of integrations is not limited to the step in which the SNR calculating unit 14 calculates the SNR. For example, in a step in which the speed calculating unit 17 selects a speed calculation method or in a step in which the speed calculating unit 17 calculates the speed (wind speed) of an aerosol, the number-of-integrations setting unit 18 can set up the number N of integrations.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because in the laser radar device in accordance with the present invention, the speed calculator is constructed in such away as to select a speed calculation method corresponding to a peak value of a signal to noise ratio detected by a peak value detector from a plurality of speed calculation methods of calculating the speed of an object to be measured, and calculate the speed of the object to be measured according to the speed calculation method, and can calculate the speed of the object to be measured in a short time with a degree of high accuracy, the laser radar device is suitable for use as a weather radar system or a wind direction wind speed radar device.

EXPLANATIONS OF REFERENCE NUMERALS

1 light transmitting and receiving unit (laser light transmitter and receiver), 2 optical oscillation unit, 3 optical system, 4 laser light detecting unit, 5 signal processing unit, 6 signal analyzing unit, 7 display and storage unit, 11 coherent integration processing unit (coherent integrator), 12 spectrum calculating unit (spectrum calculator), 13 noise signal storage device (signal to noise ratio calculator), 14 SNR calculating unit (signal to noise ratio calculator), 15 peak SNR detecting unit (peak value detector), 16 and 17 speed calculating unit (speed calculator), 18 number-of-integrations setting unit (number-of-integrations setter), 21 SNR determining unit, 22 peak detection processing unit, 23 centroid calculation processing unit, 24 maximum likelihood estimation processing unit, 31 SNR determining unit, 32 speed width determining unit.

The invention claimed is:

1. A laser radar device comprising:
a laser light transmitter and receiver that emits laser light into atmospheric air, receives laser light which is reflected by an object to be measured existing in the atmospheric air and returns to the laser light transmitter and receiver, and outputs a received signal of said laser light;
a coherent integrator that performs a coherent integration on the received signal outputted from said laser light transmitter and receiver;
a spectrum calculator that performs a Fourier transform on the received signal on which the coherent integration is performed by said coherent integrator and performs an incoherent integration on the received signal after the Fourier transform to calculate a spectrum of said received signal;
a signal to noise ratio calculator that calculates a signal to noise ratio from both the spectrum of the received signal which is calculated by said spectrum calculator, and a spectrum of a noise signal acquired without the received signal and stored in a non-transitory memory of the laser radar device;
a peak value detector that detects a peak value of the signal to noise ratio calculated by said signal to noise ratio calculator; and
a speed calculator that includes a plurality of speed selection methods of calculating a speed of said object to be measured, and the speed calculator selects one of the plurality of speed calculation methods based on both the peak value of the signal to noise ratio which is detected by said peak value detector and information showing to which one of a calculation rate of the speed and calculation accuracy of the speed a higher priority is given from an external input to the laser radar device, and the speed calculator calculates the speed of said object to be measured according to said speed calculation method.

2. The laser radar device according to claim 1, wherein when a higher priority is given to the calculation rate of the speed than to the calculation accuracy of the speed, said speed calculator selects, as said speed calculation method, a peak detection method of calculating the speed of said object to be measured from a frequency corresponding to the peak value of the signal to noise ratio which is detected by said peak value detector if the peak value of said signal to noise ratio is higher than a reference peak value, or selects, as said speed calculation method, a maximum likelihood estimation method of making variable a parameter of a predetermined waveform model of a reception spectrum, searching for a parameter having a highest correlation with the spectrum of said received signal, and calculating the speed of said object to be measured by using said parameter if said peak value is equal to or lower than said reference peak value, and, when a higher priority is given to the calculation accuracy of the speed than to the calculation rate of the speed, the speed calculator selects, as said speed calculation method, a centroid calculation method of calculating a center of gravity of one or more peak values of said signal to noise ratio, and calculating the speed of said object to be measured from a frequency corresponding to said center of gravity if said peak value is higher than said reference peak value, or selects, as said speed calculation method, said maximum likelihood estimation method if said peak value is equal to or lower than said reference peak value.

3. The laser radar device according to claim 1, wherein said speed calculator calculates a wind speed width, which is a speed width of said object to be measured, from the spectrum of the received signal which is calculated by said spectrum calculator, selects a speed calculation method corresponding to the peak value of the signal to noise ratio which is detected by said peak value detector, said information, and said wind speed width from among a plurality of speed calculation methods of calculating the speed of said object to be measured, and calculates the speed of said object to be measured according to said speed calculation method.

4. The laser radar device according to claim 3, wherein when a higher priority is given to the calculation rate of the speed than to the calculation accuracy of the speed, said speed calculator selects, as said speed calculation method, a peak detection method of calculating the speed of said object to be measured from a frequency corresponding to the peak value of the signal to noise ratio which is detected by said peak value detector if the peak value of said signal to noise ratio is higher than a reference peak value and the wind speed width is wider than a reference speed width, selects, as said speed calculation method, a centroid calculation method of calculating a center of gravity of one or more peak values of said signal to noise ratio, and calculating the speed of said object to be measured from a frequency corresponding to said center of gravity if said peak value is higher than said reference peak value and the wind speed width is equal to or narrower than said reference speed width, or selects, as said speed calculation method, a maximum likelihood estimation method of making variable a parameter of a predetermined waveform model of a reception spectrum, searching for a parameter having a highest correlation with the spectrum of said received signal, and calculating the speed of said object to be measured by using said parameter if said peak value is equal to or lower than said reference peak value, and, when a higher priority is given to the calculation accuracy of the speed than to the calculation rate of the speed, the speed calculator selects, as said speed calculation method, said centroid calculation method if said peak value is higher than said reference peak value and the wind speed width is equal to or narrower than said reference speed width, or selects, as said speed calculation method, said maximum likelihood estimation method if said peak value is higher than said reference peak value and the wind speed width is wider than said reference speed width or if said peak value is equal to or lower than said reference peak value.

5. The laser radar device according to claim 1, wherein a number-of-integrations setter that sets up a number of integrations of said incoherent integration according to the signal to noise ratio calculated by said signal to noise ratio calculator is disposed, and said spectrum calculator calculates the spectrum of said received signal by performing the number of integrations of said incoherent integration on the received signal after said Fourier transform.

6. A method of calculating a speed of an object to be measured, comprising:
a laser light transmission and reception processing step of a laser light transmitter and receiver emitting laser light into atmospheric air, receiving laser light which is reflected by an object to be measured existing in the atmospheric air and returns to the laser light transmitter and receiver, and outputting a received signal of said laser light;
a coherent integration processing step of a coherent integrator performing a coherent integration on the received signal outputted in said laser light transmission and reception processing step;
a spectrum calculation processing step of a spectrum calculator performing a Fourier transform on the received signal on which the coherent integration is performed in said coherent integration processing step and performing an incoherent integration on the received signal after the Fourier transform to calculate a spectrum of said received signal;
a signal to noise ratio calculation processing step of a signal to noise ratio calculator calculating a signal to noise ratio from both the spectrum of the received signal which is calculated in said spectrum calculation processing step, and a spectrum of a noise signal acquired without the received signal and stored in a non-transitory memory of the laser radar device;
a peak value detection processing step of a peak value detector detecting a peak value of the signal to noise ratio calculated in said signal to noise ratio calculation processing step; and
a speed calculation processing step of a speed calculator, which includes a plurality of speed calculation methods of calculating a speed of said object to be measured, selecting one of the plurality of speed calculation methods based on both the peak value of the signal to noise ratio which is detected in said peak value detection processing step and information showing to which one of a calculation rate of the speed and calculation accuracy of the speed a higher priority is given from an external input to the laser radar device, and calculating the speed of said object to be measured according to said speed calculation method.

\* \* \* \* \*